United States Patent
Ippolito et al.

(10) Patent No.: US 8,319,368 B2
(45) Date of Patent: Nov. 27, 2012

(54) WIND SYSTEM FOR CONVERTING ENERGY BY TRANSLATING ON A RAIL MODULES DRAGGED BY KITES AND PROCESS FOR PRODUCING ELECTRIC ENERGY THROUGH SUCH SYSTEM

(75) Inventors: Massimo Ippolito, Berzano di San Pietro (IT); Franco Taddei, Sirtori (IT)

(73) Assignee: Kite Gen Search S.R.L., Milan (IT)

( * ) Notice: Subject to any disclaimer, the term of this patent is extended or adjusted under 35 U.S.C. 154(b) by 645 days.

(21) Appl. No.: 12/593,804

(22) PCT Filed: Feb. 13, 2008

(86) PCT No.: PCT/IT2008/000089
§ 371 (c)(1),
(2), (4) Date: Sep. 29, 2009

(87) PCT Pub. No.: WO2008/120257
PCT Pub. Date: Oct. 9, 2008

(65) Prior Publication Data
US 2010/0117371 A1  May 13, 2010

(30) Foreign Application Priority Data
Mar. 30, 2007  (IT) .............................. TO2007A0233

(51) Int. Cl.
*F03D 9/00* (2006.01)
(52) U.S. Cl. .......................................... 290/55; 290/44
(58) Field of Classification Search ................... 290/43, 290/44, 54, 55; 244/153 R
See application file for complete search history.

(56) References Cited

U.S. PATENT DOCUMENTS

| | | | |
|---|---|---|---|
| 6,254,034 B1 * | 7/2001 | Carpenter | 244/153 R |
| 6,327,994 B1 * | 12/2001 | Labrador | 114/382 |
| 7,275,719 B2 * | 10/2007 | Olson | 244/155 A |
| 8,134,249 B2 * | 3/2012 | Ippolito et al. | 290/55 |
| 2002/0040948 A1 * | 4/2002 | Ragner | 244/153 R |
| 2007/0228738 A1 | 10/2007 | Wrage et al. | |
| 2009/0278353 A1 * | 11/2009 | Da Costa Duarte Pardal et al. | 290/44 |

FOREIGN PATENT DOCUMENTS

| | | |
|---|---|---|
| DE | 2812787 A1 | 10/1979 |
| DE | 10146085 A1 | 4/2003 |
| FR | 2667904 A | 4/1992 |

OTHER PUBLICATIONS

International Search Report dated Nov. 14, 2008 for PCT/IT2008/00089.

* cited by examiner

*Primary Examiner* — Nicholas Ponomarenko
(74) *Attorney, Agent, or Firm* — Fleit Gibbons Gutman & Bongini & Bianco PL; Stephen Bongini

(57) ABSTRACT

A wind system (1) is described for converting energy comprising at least one kite (2) that can be driven from ground immersed in at least one wind current (W) and at least one module (5) adapted to translate on at least one rail (6; 7) placed next to the ground, such module (5) being connected through at least one rope (4) to the kite (2), in order to drag the module (5) on the rail (6; 7) and to perform a conversion of wind energy into electric energy through at least one electric energy generating system cooperating with module (5) and rail (6; I) 1 such rope (4) being adapted both to transmit mechanical energy from and to the kite (2) and to control the flight trajectory of the kite (2).

50 Claims, 22 Drawing Sheets

WIND SYSTEM FOR CONVERTING ENERGY BY TRANSLATING ON A RAIL MODULES DRAGGED BY KITES AND PROCESS FOR PRODUCING ELECTRIC ENERGY THROUGH SUCH SYSTEM

The present invention refers to a wind system for converting energy by translating on a rail modules dragged by kites. The present invention further refers to a process for producing electric energy through such system.

In the past, the problem of producing electricity at low cost by exploiting renewable energy sources has already been dealt with; in particular, in some prior patents mentioned below, processes for converting wind energy have been proposed, together with several devices that subtract wind energy to the wind through power wing profiles (generically designated with the term "kite").

In particular, U.S. Pat. No. 4,124,182 discloses a device equipped with "parakites" (or "modified parachutes") to capture wind energy and convert it into the rotary motion of a shaft that actuates a generator. This device is characterised by a pair of "trains of parakites" in which the kites are arranged in series. Each train is equipped with a power rope. Such cables are long enough to allow the trains of parakites to reach heights at which stronger and more uniform winds blow with respect to those that blow at earth surface level. Every train is constrained through the corresponding power rope to a drum or a winch whose rotation direction can be alternated so that it winds again the ropes or allow unwinding the ropes due to the wind current traction. Every train of parakites is equipped with a second rope, called "cap-type", connected to each train kite and through which it is possible to selectively collapse the parakites to facilitate the rewinding procedure. Through a reducer, the rotary motion of each winch is transferred to a generator that, when actuated, produces electricity. There is a single system of pulleys that, through clutches and gears, makes a train of parakites recovered while the other one ascends. The captured wind energy is therefore converted into mechanical energy that in part is immediately spent for recovering the train of parakites whose cap has been closed, and in part is converted into electric energy. Through an aerostatic balloon constraint to each train and inflated and deflated upon every operating cycle, the parakite are kept at a desired height and the caps have a fixed orientation.

Chinese patent CN 1.052.723 discloses a current wind generator equipped with a pair of kites through which the traction exerted by the wind currents is converted, through high-resistance ropes, into the rotation of a drum placed at ground level. The winch actuates a hydraulic motor through which the current production occurs.

British patent GB 2.317.422 discloses a device equipped with a plurality of kites that, due to the wind action effect, rotate a vertical shaft connected to a generator for producing current. The kites are pushed by the wind performing a circular path in the horizontal plane. Every kite is equipped with a device able to modify the wind attack angle in order to guarantee flight continuity.

U.S. Pat. No. 6,072,245 discloses a device for exploiting wind energy composed of a multitude of kites connected to ropes forming a ring. The kites are driven in order to alternate an ascending path to a descending one, determining a rotary motion of the ring always along the same direction. Every kite is connected to a power for transmitting mechanical energy and to a system of driving ropes for adjusting the wind attack angle of each kite. The power rope determines the rotation of pulleys through which the electricity production occurs. The driving ropes are used for making each kite assume a position that, in the ascending path, allows the kite to be dragged upwards by the wind, and a second position in the descending path so that the kite is subjected to a lower wind thrust.

U.S. Pat. No. 6,254,034 discloses a device equipped with a kite ("tethered aircraft") pushed by the wind currents at a controlled height, in order to exploit the wind energy. The kite is connected through a rope to a winch that actuates a generator for producing electric energy. On board the kite, a driving system is assembled, that detects and modifies the wind attack angle and modifies the intercepted wind front area. Such system is controlled from ground by an operator, that reads on a display data transmitted by suitable sensors, or automatically through a remote control system. The kite is driven in order to downwind ascend with a high attack angle. After having ended the ascension, the attack angle is reduced and the kite glides in order to bring itself upwind. The kite is recovered, again glides downwind and the cycle is repeated.

Dutch patent NL1017171C discloses a device similar to the previous above described one in which however the manual driving mode is not provided, and in which the kite recovery occurs by slanting the kite as a flag, in order to minimise the wind thrust when rewinding the ropes.

U.S. Pat. No. 6,523,781 discloses a device composed of a kite ("airfoil kite") through which the wind energy is captured, having an inlet edge, an outlet edge and two side edges. Such kite is driven through a mechanism supported by the kite itself. This device is equipped with ropes connected to the kite edges and the kite is driven by modifying, through these ropes, the pitch angle. The driving mechanism is supplied by electric cables placed inside a power rope that connects the kite to a winch that actuates a generator for producing electricity. The kite ascends pushed by the wind exploiting the lift force and describing an almost perpendicular path to the wind speed direction. After having ended the ascension, the kite is recovered and afterwards driven in order to capture again the wind.

U.S. patent application US2005046197 discloses a device equipped with a kite for exploiting the wind energy that generates electricity by actuating, by means of ropes, a winch connected to a generator. The kite is driven by means of additional ropes through which the wind attack angle is modified. The kite ascends with a high attack angle. After having ended the ascension, the attack angle is minimised and the kite is recovered in order to start the cycle again.

Italian patent application TO2006A000491 of the same Applicant of the present Application discloses a wind system for converting energy comprising at least one kite that can be driven from the ground immersed in at least one wind current and a wind turbine with vertical axis placed at ground level, such wind turbine being equipped with at least one arm connected through two ropes to the kite, such kite being adapted to be driven by the turbine in order to rotate the arm and perform the conversion of wind energy into electric energy through at least one generator/motor system operating as generator cooperating with the turbine, the ropes being adapted both to transmit mechanical energy from and to the kites and to check the kite flight trajectory. In such wind system with arms and rotating shaft, the production of electric energy occurs by exploiting the twisting moment generated on the turbine arms by the kites and driving of the kites occurs only by means of ropes. Moreover, in such wind system with arms and rotating shaft, the components arranged for storing the ropes and driving the kites are in the turbine centre and therefore far away from the point in which the ropes go away from the ground towards the kites. Finally, in such wind system with arms and rotating shaft, the kite recovering pipes are fixed.

Anyway, as can be noted by analysing the existing prior art, known wind systems equipped with kites have in general the following common characteristics:

the kites are equipped both with power ropes and with driving ropes: this means that the rope load through which the electricity production occurs is not transmitted to the kite driving mechanisms, but to other wind system components, through ropes suitably employed for performing this function. The lack of use of power ropes for driving the kites makes the wind system structure complicate, with all related disadvantages;

the kites are driven by mechanisms directly installed on the kites or through auxiliary (driving) ropes. Unwinding and rewinding of these ropes occur by means of winches exclusively used for such purpose, placed at ground level or suspended from the ground (namely supported by the kites themselves). In case of use of driving ropes, placement of winches at ground level, allows not to consume part of the energy subtracted from the wind currents to support the driving mechanisms weight;

the kites are driven in order to generate electricity when ascending by exploiting the drag force (namely the wind thrust component parallel to the wind speed). Such step is followed by the recovery of kites by placing the kites as flags, in order to minimise the braking effect. In a limited number of wind systems, it has been devised to exploit the lift force (namely the wind thrust component perpendicular to the wind speed) in addition to the drag force in order to make the kites climb. The advantage deriving form the use of this latter driving mode with respect to the previous one consists in that, in order to produce electricity, not only the kite resistance but also the kite lift is exploited. Anyway, in both modes, the intermittence-type operating cycle (an ascending step alternated with a recovery step) implied that the dragging effect of the kites through which the production of electricity occurs, is present only during half of the path described by the kites (in fact, it is absent during the recovery);

the energy conversion occurs by imposing, through the power ropes, the rotation of winches connected to generators, possibly by interposing reducers. This does not allow producing energy with continuity during an operating cycle, since the kite recovery occurs by actuating such winches through motors. In such a way, an electricity generation interruption occurs and a consumption of the previously produced energy. The continuous current delivery to external users is made possible by using accumulators;

attention has been focused exclusively on the production of electricity through a cyclic process. The choice of the path that the kites must describe when flying in order to maximise the rate of converted energy is almost completely neglected;

the problems related to the control system of a kite or of a train composed of many kites connected in series are dealt with in detail in an extremely reduced number of projects and researches. This is also due to the fact that current researches are mainly focused on the increase of productivity of already existing systems instead of on the development of new energy producing systems.

In order to partially solve the above problems, European Patent Application EP 1 672 214 in the name of Sequoia Automation S.r.l. instead discloses a system for converting kinetic energy of wind currents into electric energy through the predictive and adaptive check of the flight of kites connected to a "carousel"-type system using a vertical axis turbine.

Object of the present invention is solving the above prior art problems by providing a wind system for converting energy by translating on a rail modules dragged by kites that is different from the current state of the art in particular due to the modes with which the kites are driven, the path traveled by such kites when flying in order to maximise the rate of converted energy and the wind system architecture, in which each module is connected through at least one rope to a train of kites that, pushed by the wind and suitably driven, generates at module level, a traction due to which the module translated on at least one rail that performs a closed path and through a generating system cooperating with module and rail generates electric energy.

Another object of the present invention is providing a wind system for converting energy by translating on rail modules dragged by kites in which the kites are driven by a smart control system that takes the kites to perform when flying an optimum path in order to optimise the wind energy that can be subtracted from the wind.

Another object of the present invention is providing a wind system for converting energy by translating on rail modules dragged by kites in which the kites composing the wind system of the present invention are driven through the same ropes through which energy is transferred to the wind system modules.

Moreover, an object of the present invention is providing a wind system for converting energy by translating on rail modules dragged by kites in which the kites are driven by a smart control system that actuates motors connected to winches, possibly by interposing reducers, placed next to the ground and integral with the wind system modules, such winches operating both in driving the kites by unwinding and rewinding the ropes wound around them, and in supporting the ropes load for converting energy.

Another object of the present invention is providing a wind system for converting energy by translating on rail modules dragged by kites in which the kites are driven in order to allow converting the wind energy by mainly exploiting the lift force and in order to perform a path during which the dragging effect is present almost for the whole length of the operating cycle.

A further object of the present invention is providing a wind system for converting energy by translating on rail modules dragged by kites in which the energy conversion occurs through generators actuated not by the rotation of winches, but by the translation of the wind system modules.

Another object of the present invention is providing a wind system for converting energy by translating on rail modules dragged by kites comprising a ring guide with at least one module that translates on at least one rail, and that converts energy by exploiting the translation of modules due to the dragging effect by the kites connected to said modules.

Another object of the present invention is providing a wind system for converting energy by translating on rail modules dragged by kites in which the kites composing the system can be also driven through spoilers placed on board the same kites, creating turbulences that give rise to pressure gradients.

Another object of the present invention is providing a wind system for converting energy by translating on rail modules dragged by kites in which the components provided for storing the ropes and driving the train of kites are on board of each module, next to the kite recovering systems.

Moreover, an object of the present invention is providing a wind system for converting energy by translating on rail modules dragged by kites in which the kite recovering systems have an end part adapted to be oriented, with the chance of rotating both in the horizontal and in the vertical planes.

Another object of the present invention is providing a process for producing electric energy through a wind system according to the present invention that is more efficiently actuated with respect to what has been proposed by the prior art.

The above and other objects and advantages of the invention, as will result from the following description, are obtained with a wind system for converting energy by translating on rail modules dragged by kites as claimed in claim 1.

Moreover, the above and other objects and advantages of the invention are obtained with processes for producing electric energy through a system according to the present invention as claimed in the method claims.

Preferred embodiments and non-trivial variations of the present invention are the subject matter of the dependent claims.

The present invention will be better described by some preferred embodiments thereof, provided as a non-limiting example, with reference to the enclosed drawings, in which.

Figure 1:
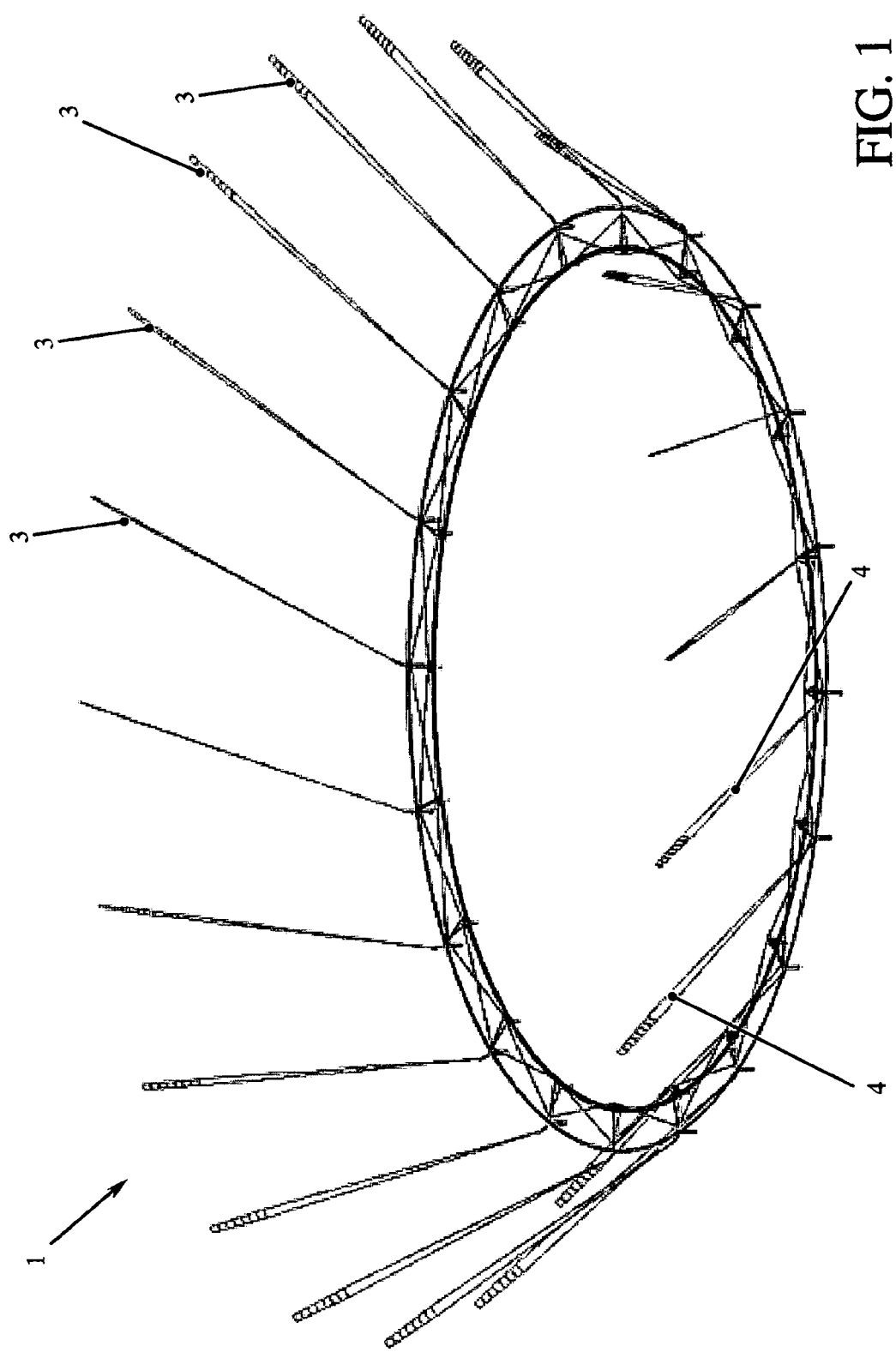
FIG. 1 shows a perspective view of a preferred embodiment of the wind system according to the present invention.
Figure 2:
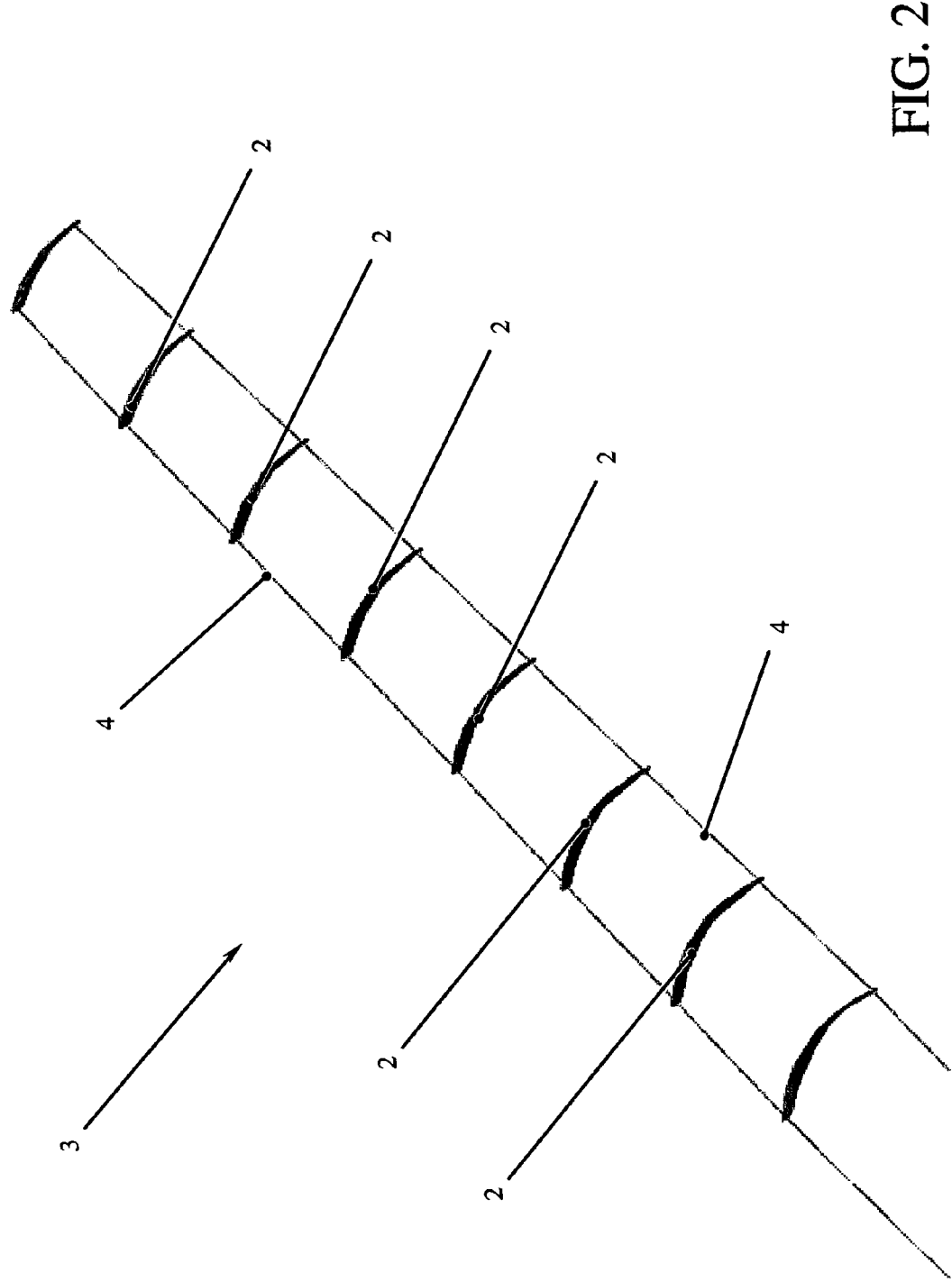
FIG. 2 shows an enlarged perspective view of a preferred embodiment of a component of the wind system of FIG. 1.
Figure 3:
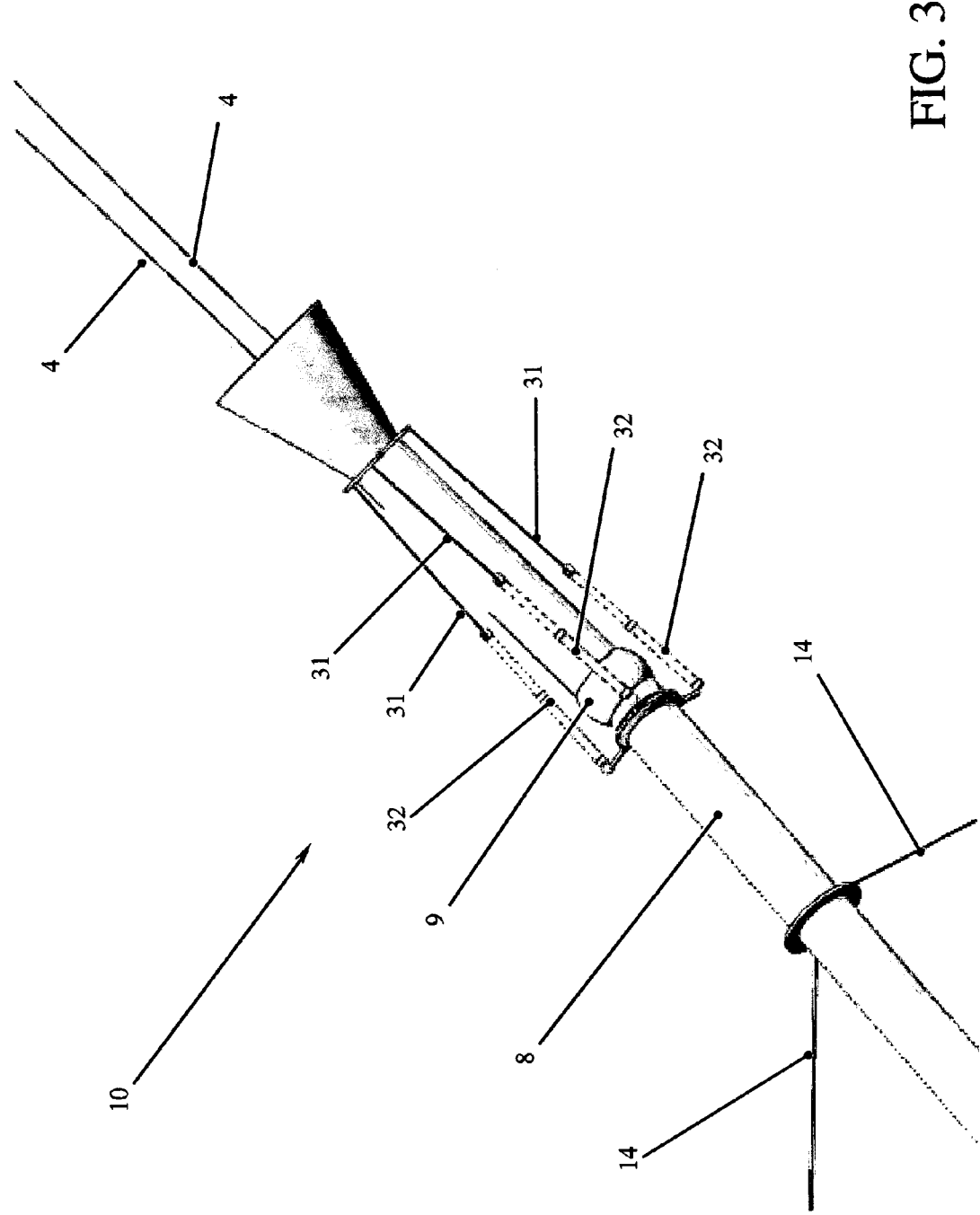
FIG. 3 shows an enlarged perspective view of a preferred embodiment of another component of the wind system of FIG. 1.
Figure 4:
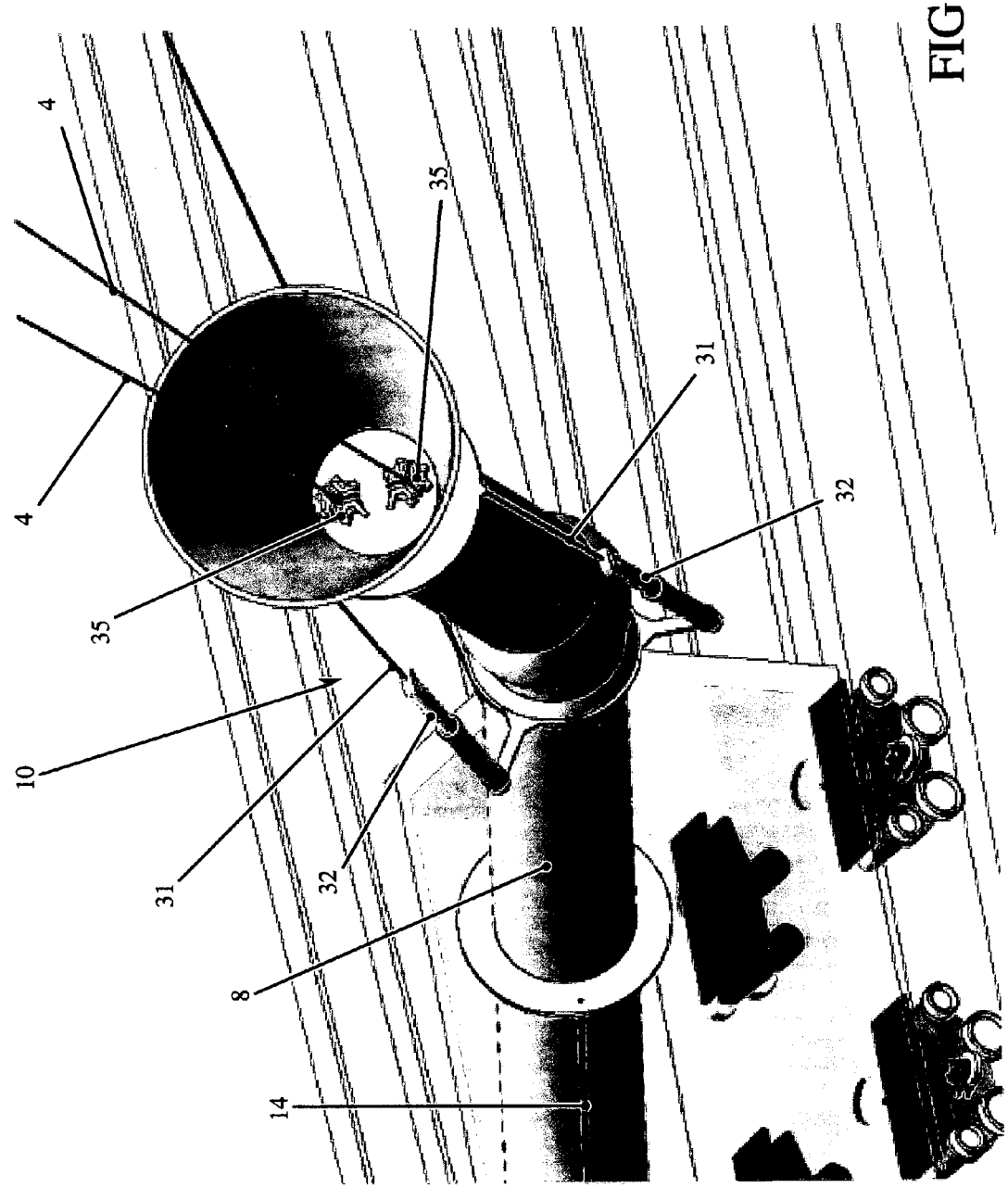
FIG. 4 shows another perspective view of the component of FIG. 3.
Figure 5:
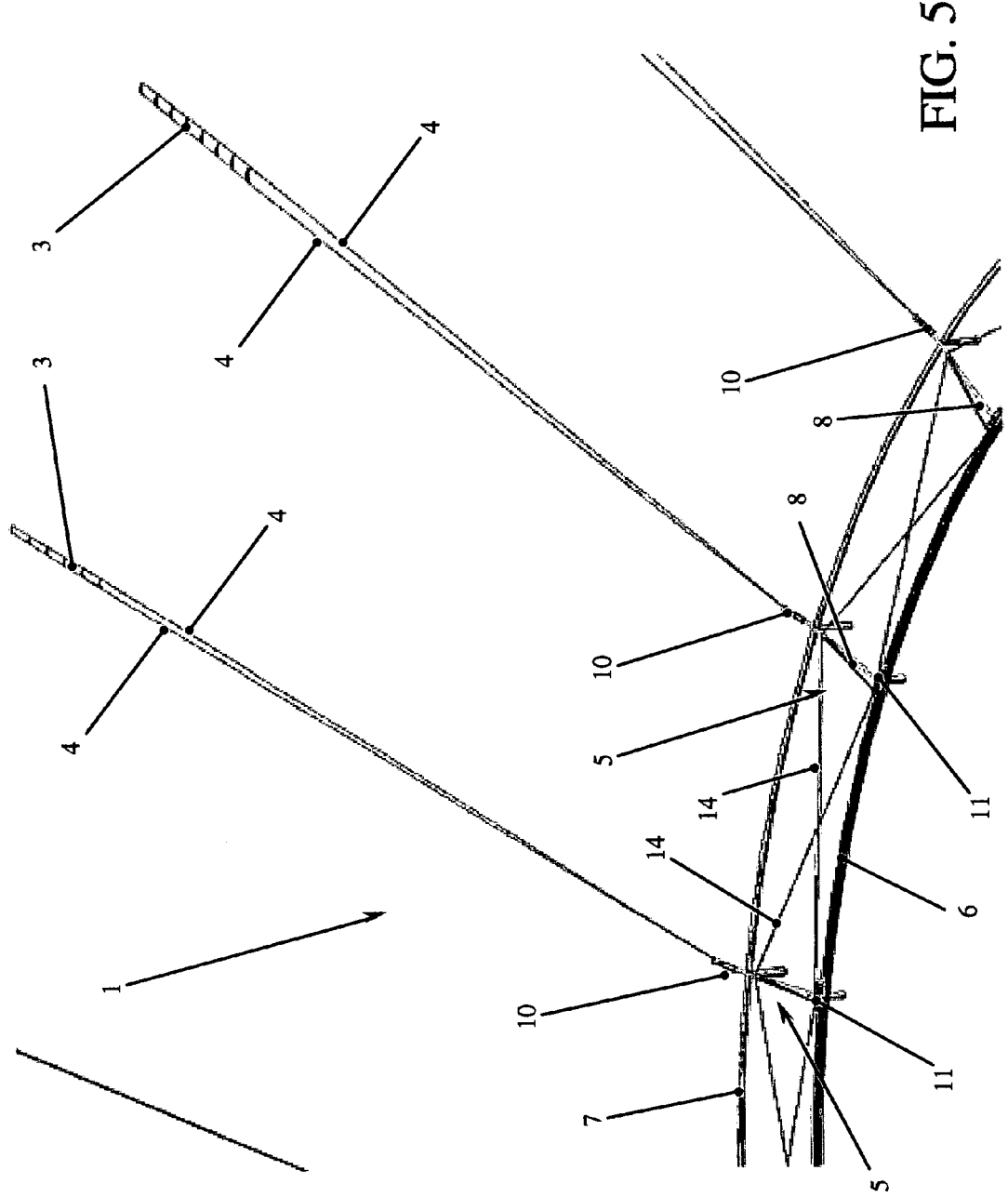
FIG. 5 shows an enlarged perspective view of the wind system of FIG. 1.
Figure 6:
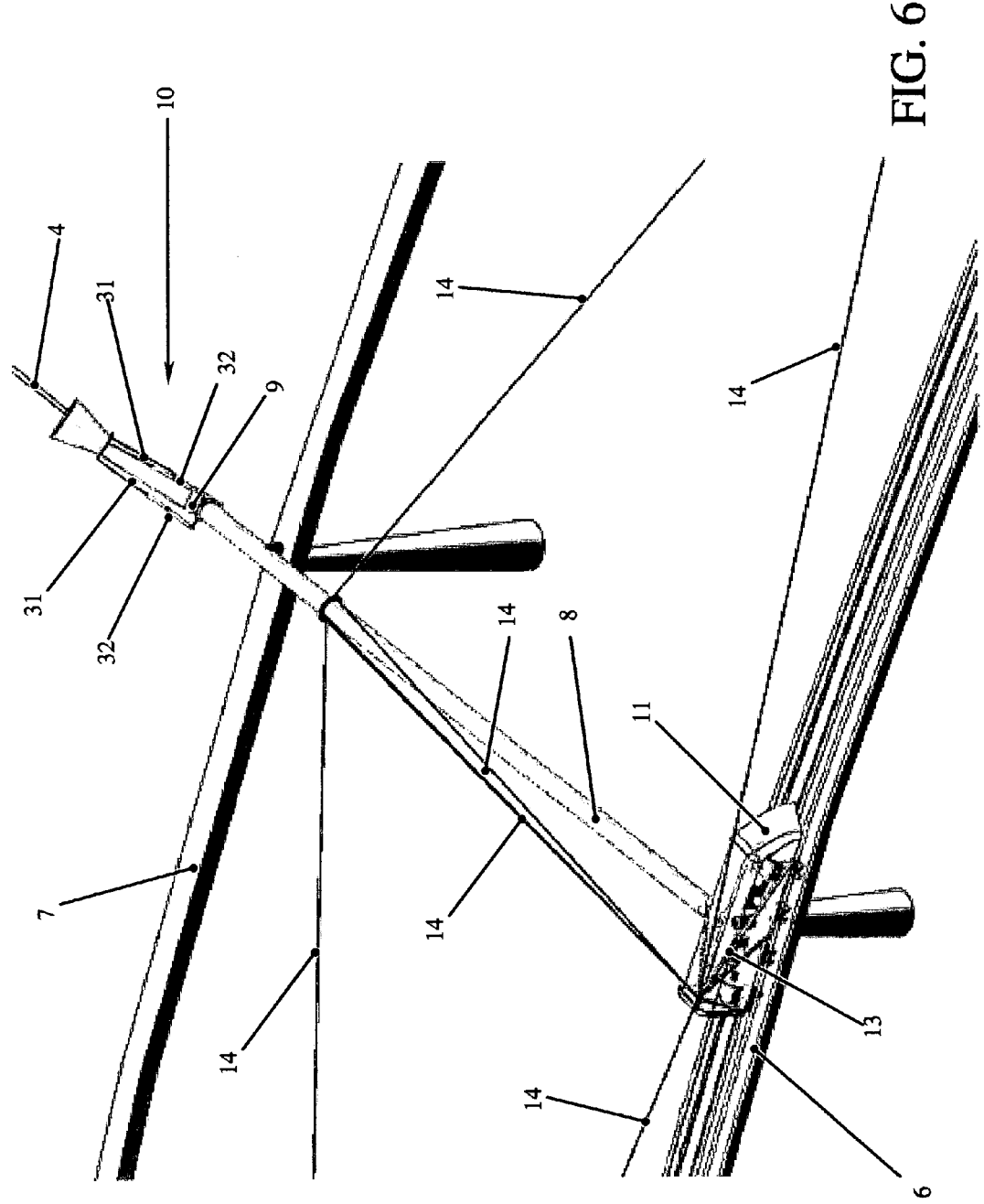
FIG. 6 shows another enlarged perspective view of the wind system of FIG. 1.
Figure 7:
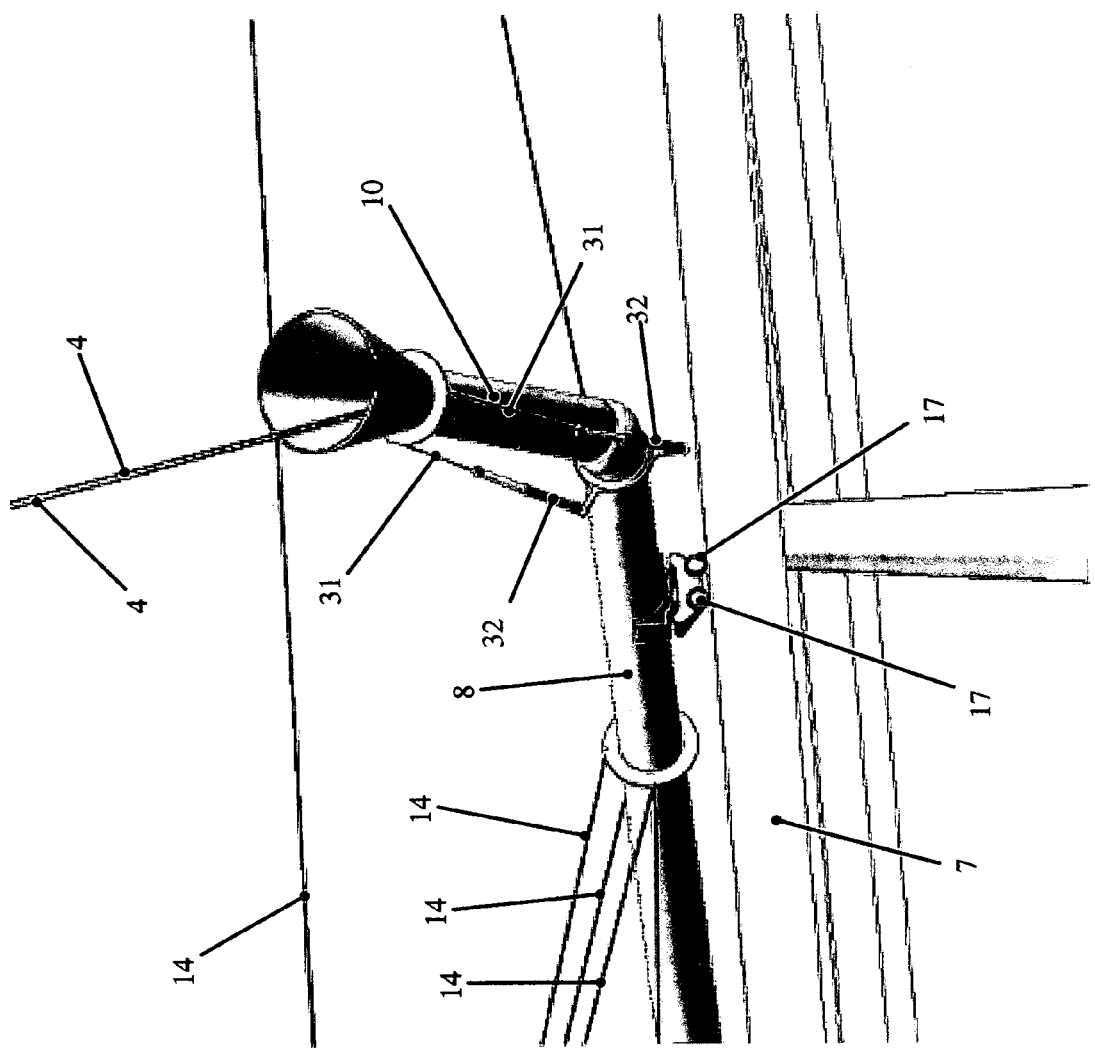
FIG. 7 shows an enlarged perspective view of a preferred embodiment of another component of the wind system of FIG. 1.
Figure 8:
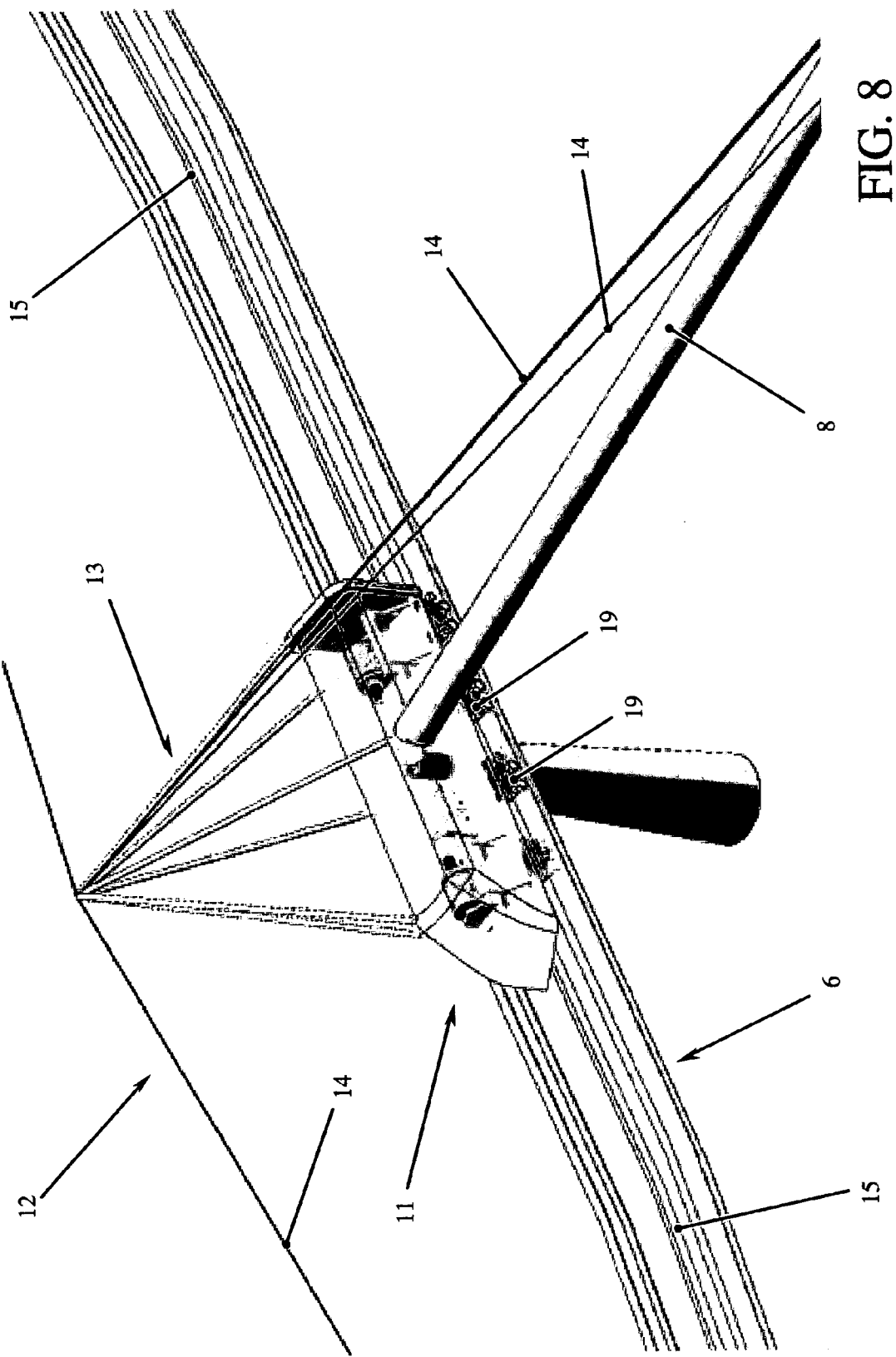
FIG. 8 shows an enlarged perspective view of a preferred embodiment of another component of the wind system of FIG. 1.
Figure 9:
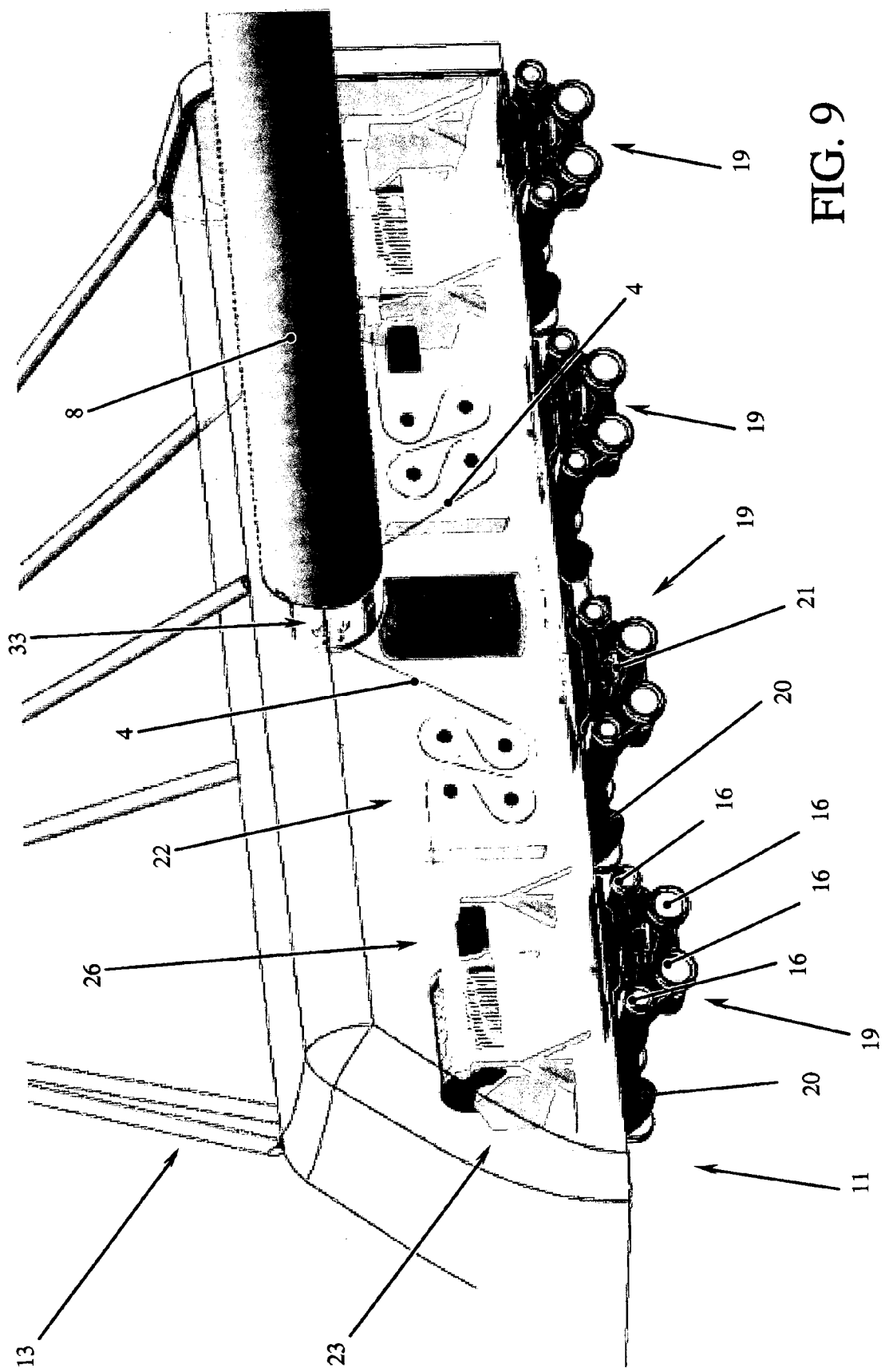
FIG. 9 shows an enlarged perspective view of the component of FIG. 8.
Figure 10:
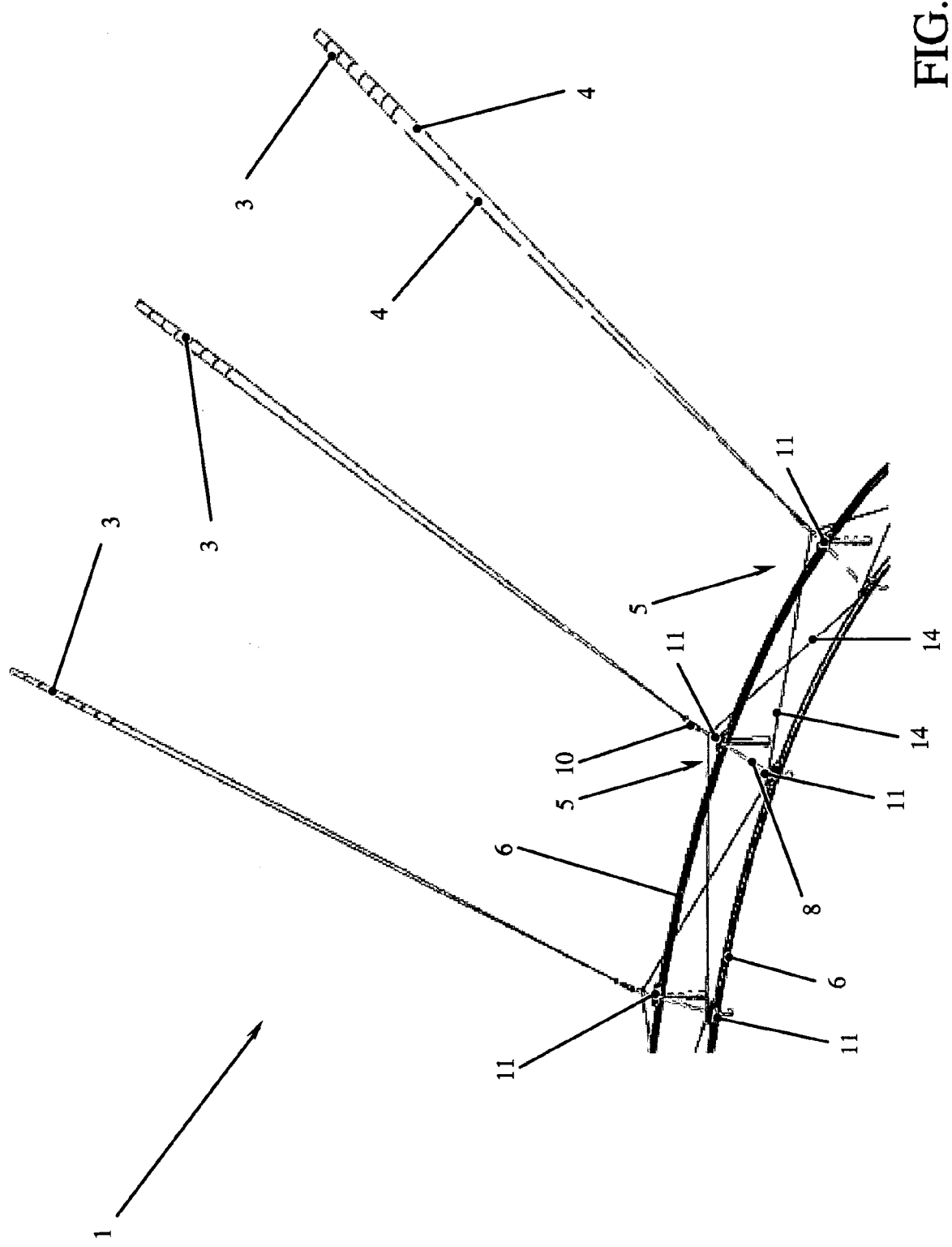
FIG. 10 shows a perspective view of a preferred variation of the wind system according to the present invention.
Figure 11:
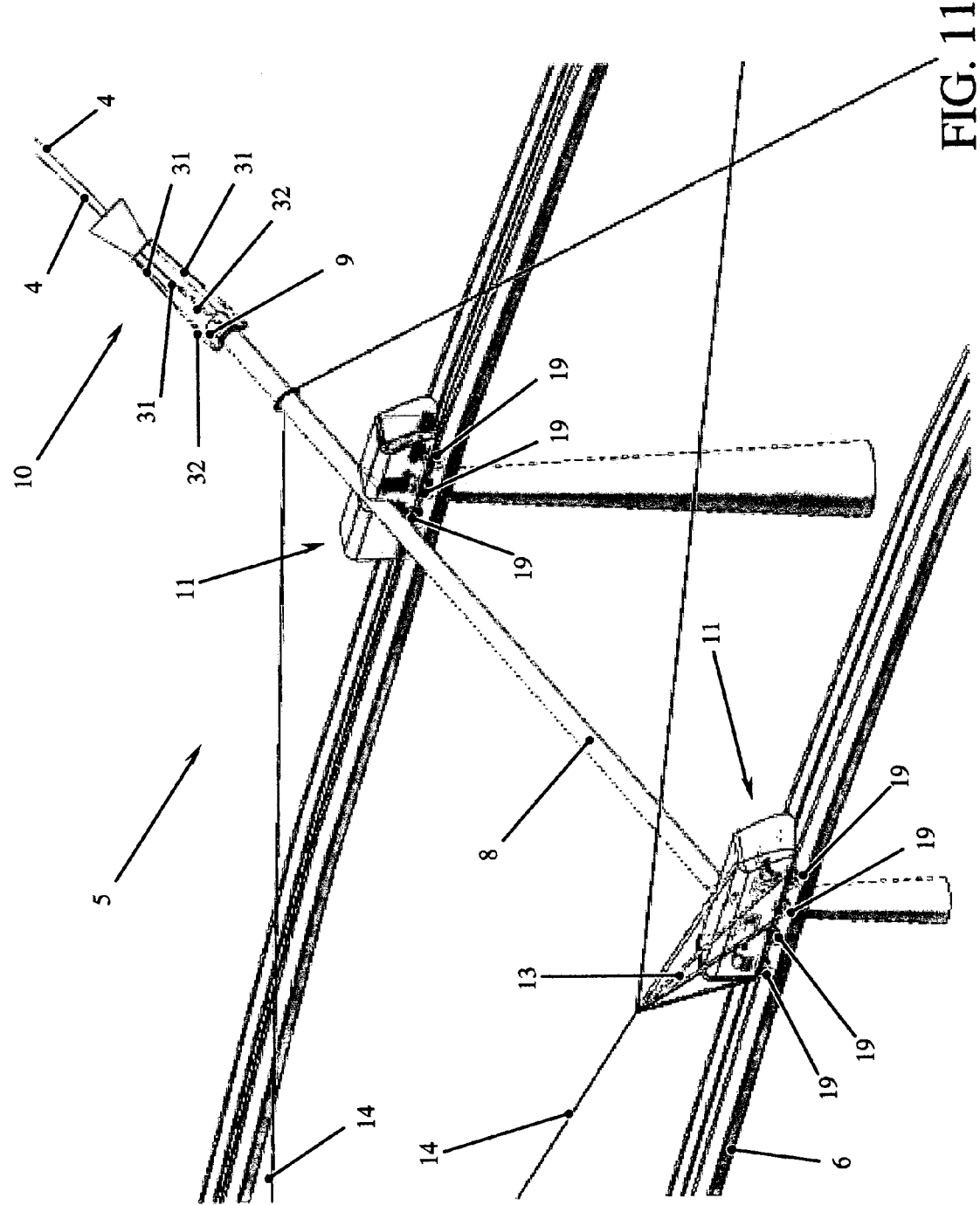
FIG. 11 shows an enlarged perspective view of the wind system of FIG. 10.
Figure 12:
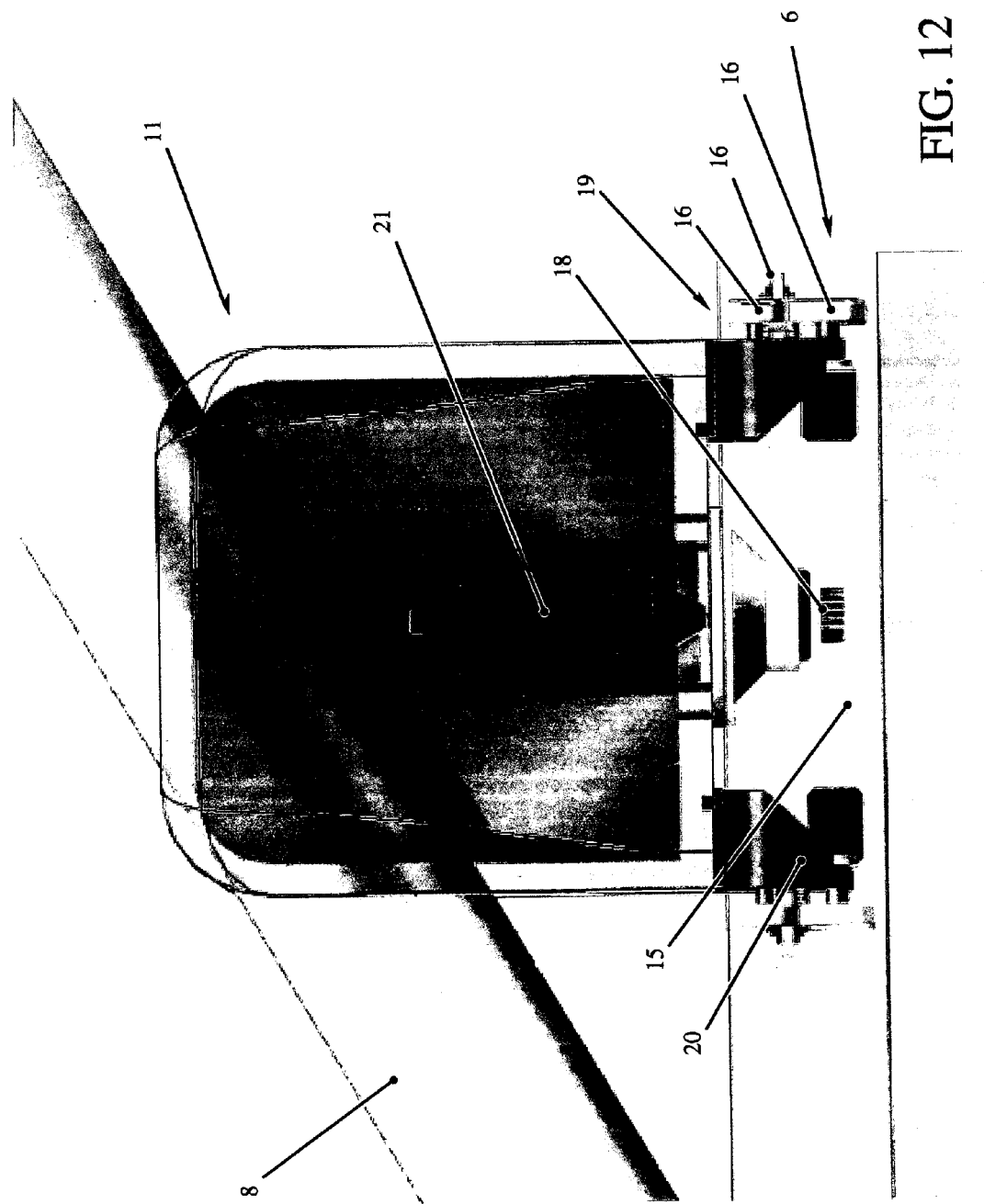
FIG. 12 shows an enlarged perspective view of a preferred embodiment of a component of the wind system of FIG. 10.
Figure 13:
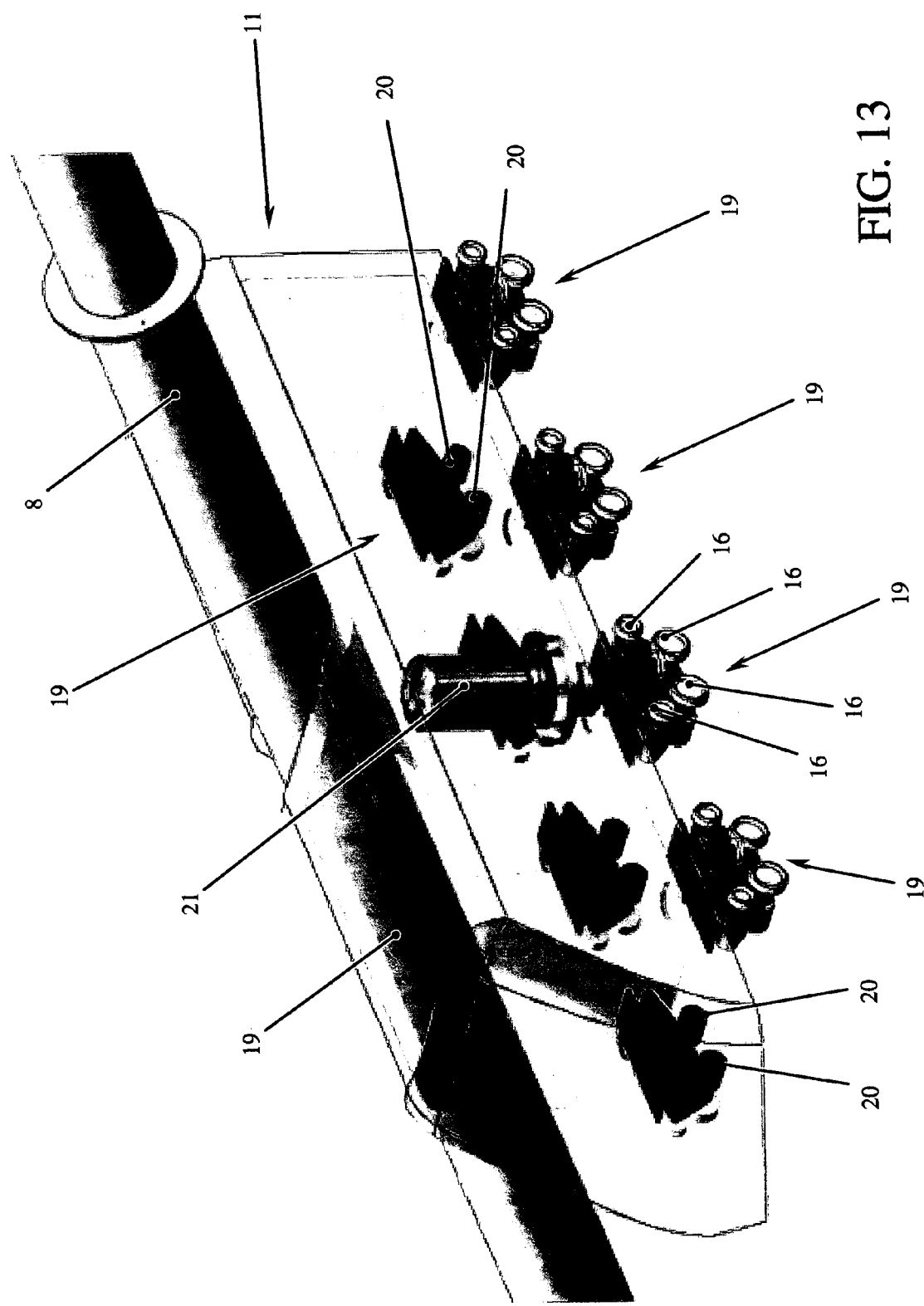
FIG. 13 shows another perspective view of the component of FIG. 12.
Figure 14:
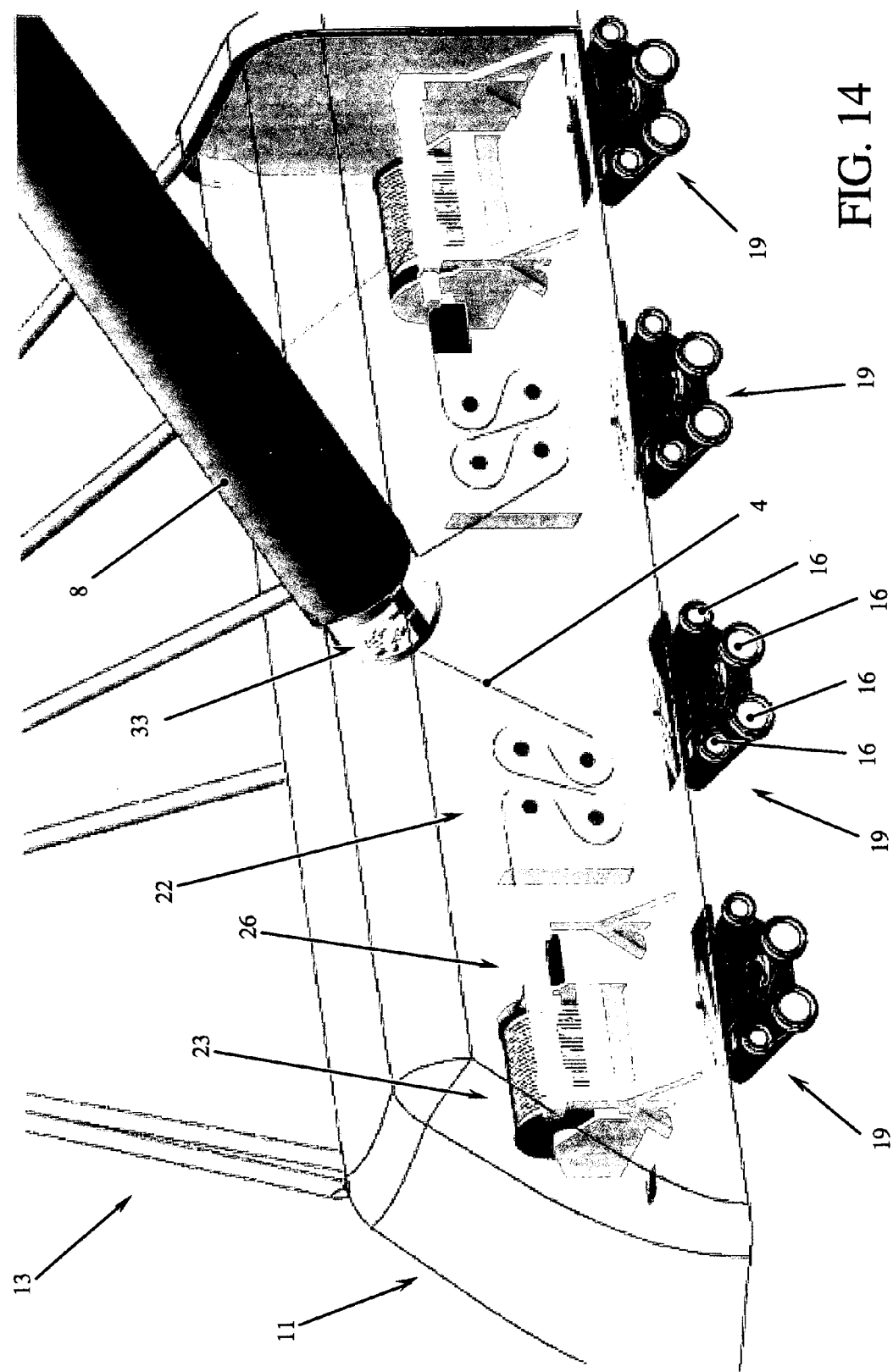
FIG. 14 shows an enlarged perspective view of a preferred embodiment of another component of the wind system of FIG. 10.
Figure 15:
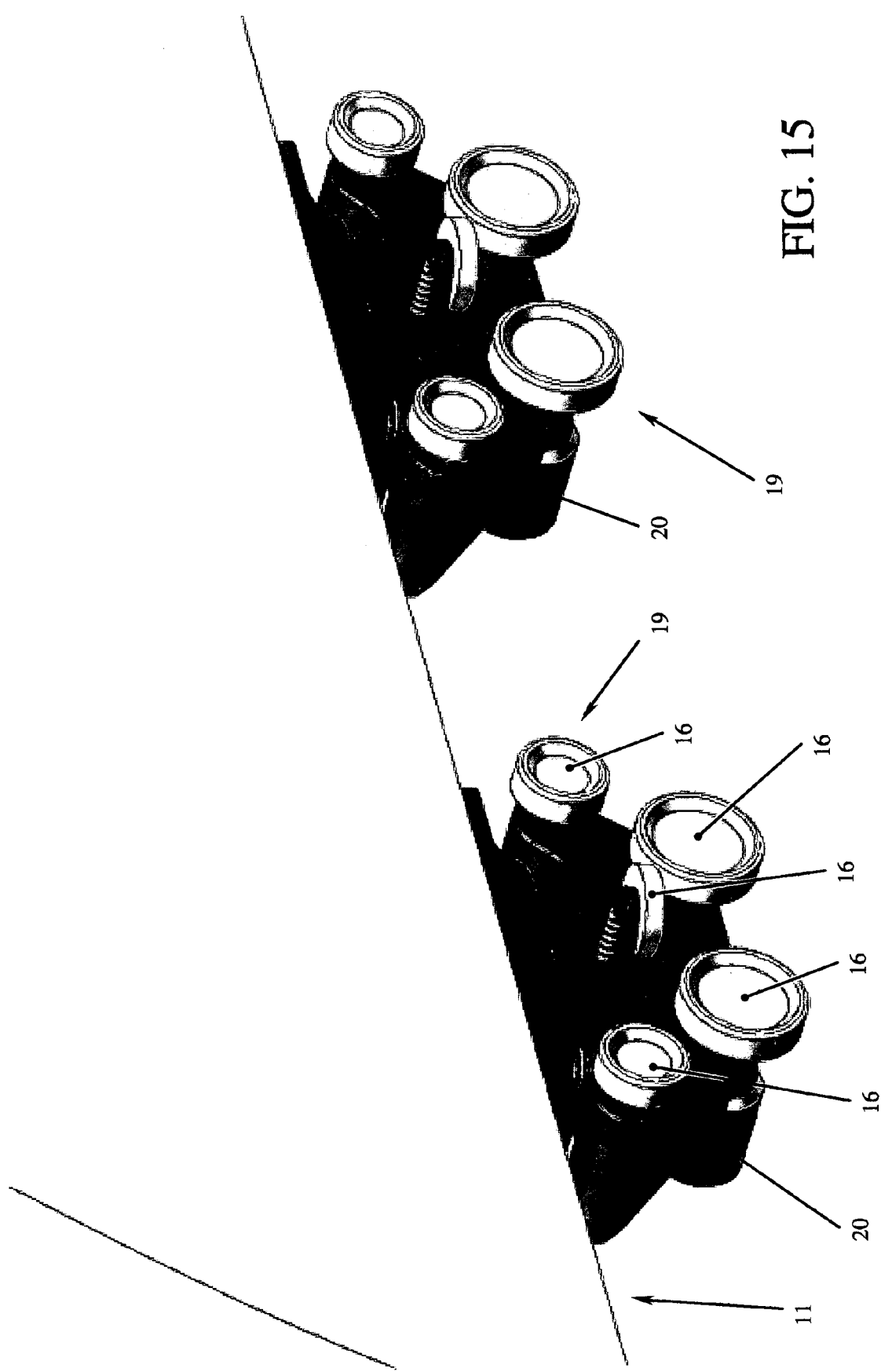
FIG. 15 shows an enlarged perspective view of a preferred embodiment of another component of the wind systems of FIGS. 1 and 10.
Figure 16:
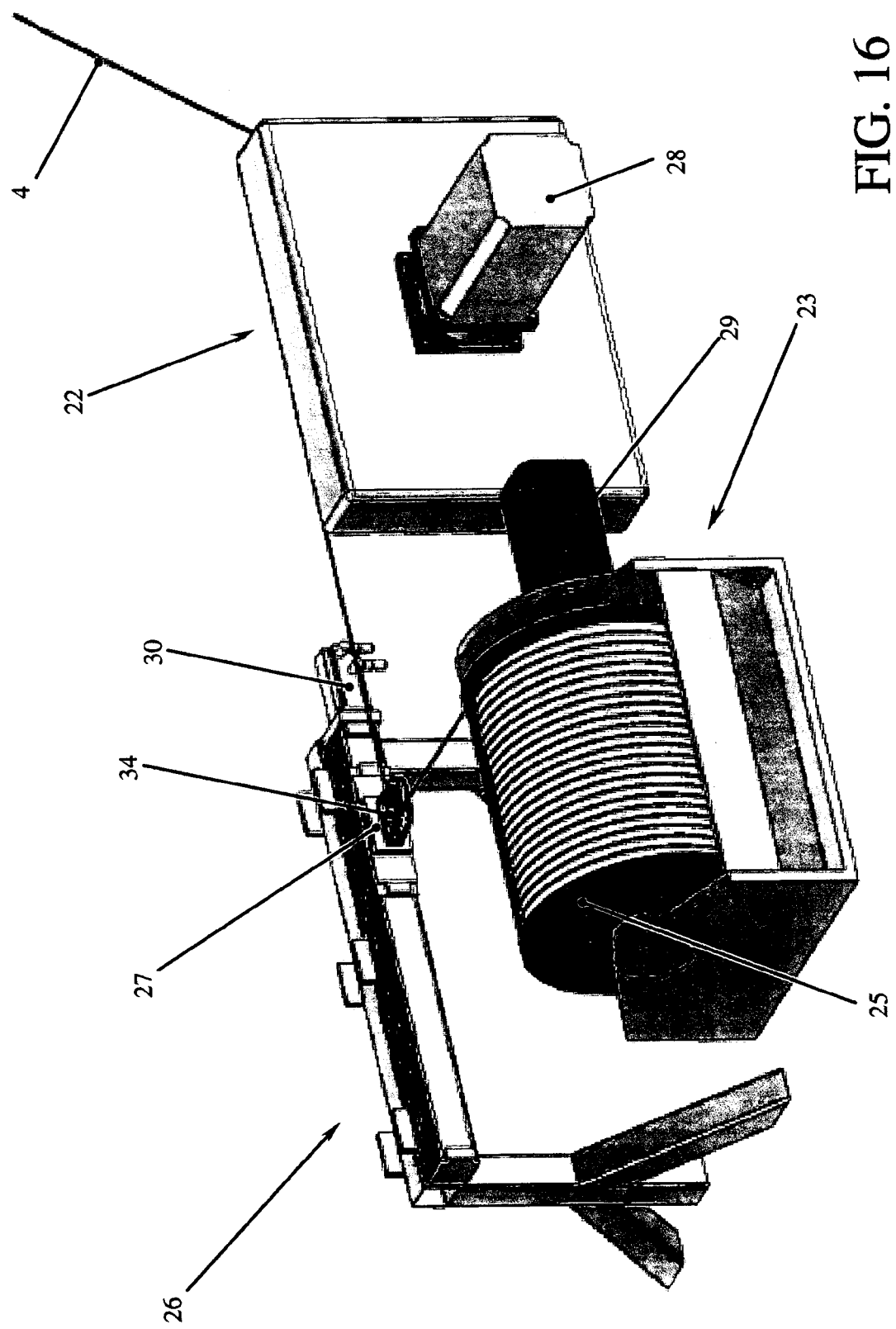
FIG. 16 shows an enlarged perspective view of a preferred embodiment of other components of the wind systems of FIGS. 1 and 10.
Figure 17:
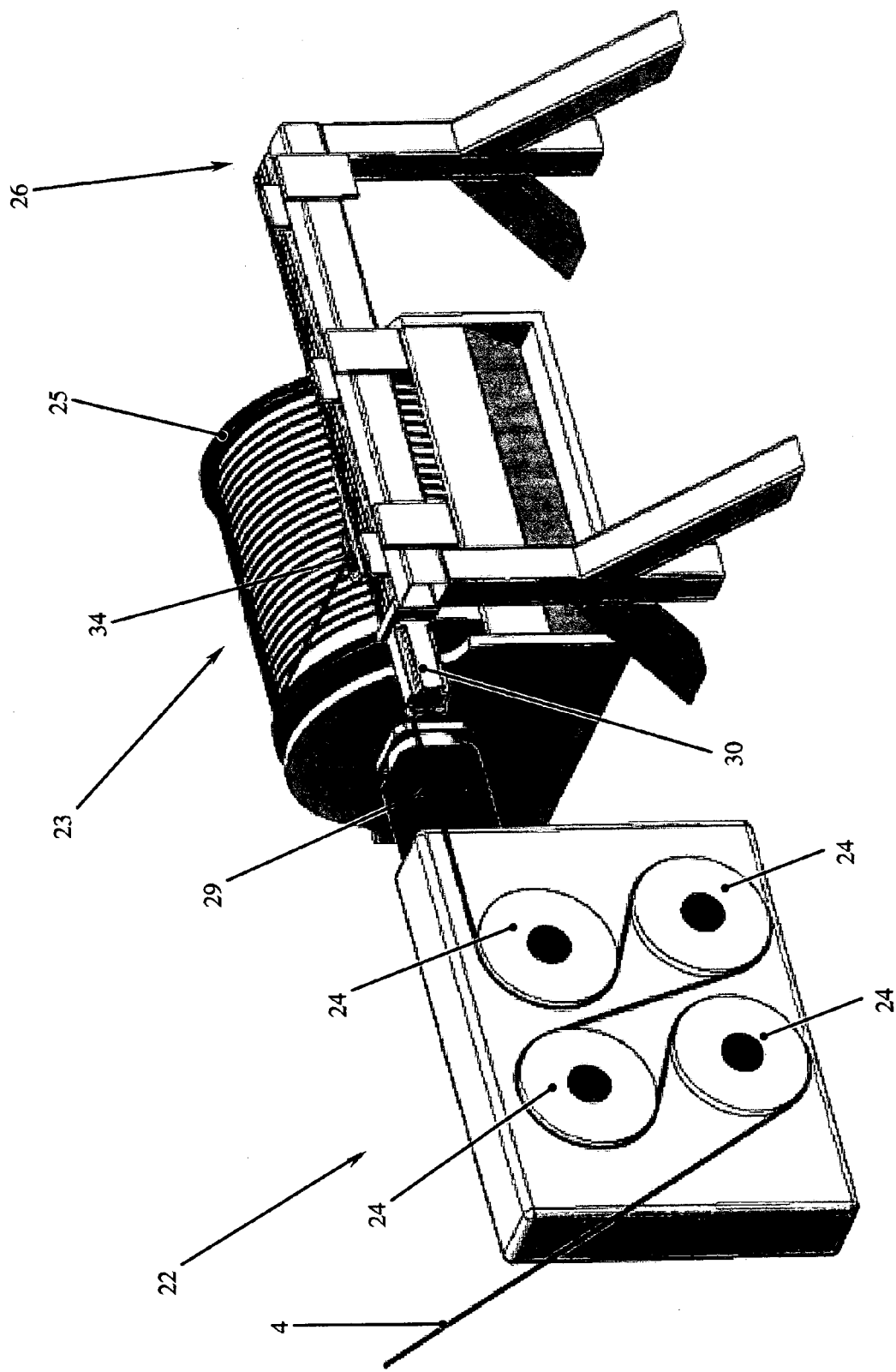
FIG. 17 shows another enlarged perspective view of the components of FIG. 16.

As can be seen in more detail in the following description, in general the wind system according to the present invention comprises at least one module adapted to translate along a rail, preferably made in order to compose a ring-type closed circuit, under the thrust of at least one power kite immersed into a wind current to which it is connected through at least one rope, such module behaving like an autonomous generator that converts into electric current the wind energy captured at troposphere level (that extends up to approximately 15 km from the earth surface). In particular, next to each module, the energy is subtracted from the wind through a train of kites connected in series, driven by means of servo-assisted winches autonomously controlled by a smart control system.

With reference to the Figures, it is possible to note that the wind system 1 for converting energy according to the present invention comprises at least one power wing profile 2 (herein below also briefly designated by the term "kite") immersed in at least one wind current W and connected through at least one rope 4 to at least one module 5 for generating electricity, placed next to the ground and adapted to translate along at least one rail 6 or 7. The kites 2 are driven in order to drag the modules 5 to which they are connected and allow converting wind energy into electric energy through at least one generating system, comprising at least one generator/motor 20 and/or 21 described below, for each module 5. The ropes 4 are adapted both to transmit mechanical energy from and to the kites 2 for dragging the modules 5, and to control the flight trajectory of the kites 2 themselves.

Herein below, a preferred embodiment of the wind system 1 according to the present invention will be described. With reference to each component of the wind system 1, moreover a series of alternative characteristics and functionalities will be included that, without impairing the performance that can be reached, highly reduce cost and sizing of the whole system 1. For such purpose, computer-aided multi-criteria decision techniques can help define optimum paths to reach the best structural architectures, as well as the control techniques whose objective is optimising the device operation and productivity.

Design alternatives are of a continuous or discrete type. Continuous functions can be easily explored by relating the benefits that can be obtained by changing attributes such as cost, weight, resistance, lengths, angles applied to a solution. Discrete alternatives have to be listed and herein below, with reference to each component of the wind system 1, their major characteristics are described.

The wind system 1 of the present invention therefore comprises kites 2 made, for example, by weaving fibres commonly used for manufacturing specific sails for certain sports activities, such as for example surf and kart. Due to recent aerodynamics studies, kites 2 are available on the market that are able to satisfy certain needs in terms of control and drivability. By suitably driving a kite 2, it is possible to modulate the energy transfer from wind: this is fundamental since the kites 2 must be driven so that the traction exerted by means of the wind currents W is maximum and at the same time does not impair the travel of modules 5 on rails 6. The kites 2 must therefore be driven in order to produce a traction that translates the modules 5 on the rails 6 always along the same direction. Such result is reached by suitably modulating the energy transfer from the wind, as will be seen afterwards in more detail.

When the kites 2 when flying tend to rise at their operating speed, the aerodynamic resistance of ropes 4 connected to the system 1 base implies a chain-type distortion that modifies the attack angle of the kites 2, making them assume a gliding position with increased efficiency. By adjusting the attack angle of the kites 2 in order to show them slightly pulled up or flapped, an intrinsically feedback-type system is obtained that settles the apparent speed of kites 2.

The power that a kite 2 is able to subtract from wind is function both of the aerodynamic efficiency of the kite 2 and of its area. In particular, such power increases with the square of the aerodynamic efficiency and linearly with the area. In order to locate the optimum solution that maximises the power that a kite 2 is able to subtract to wind, it is therefore possible to intervene on those two factors.

A kite efficiency depends on the kite shape. The choice of an optimum shape is therefore a decisive contribution for obtaining great aerodynamic efficiencies. Such optimum shape must however be kept also when the kite 2 is subjected to stresses of drag and lift forces (as better explained below). For such purpose, it is possible to use semi-rigid kites 2. Differently from the completely flexible kites 2, the semi-rigid kites 2 are equipped, for example, with an extremely light frame, due to which the kites 2 can assume, for example, a similar shape to rigid glider wings. The kites 2 can, for example, be structured as lozenges made of polymers. The use of semi-rigidity ensures a great improvement of performance, not only due to a better aerodynamic efficiency, but also due to a better driving easiness. In particular, rigidity can be asymmetric with respect to the two kite 2 sizes in order to guarantee a side flexibility useful for recovering the kite 2 in a corresponding recovering system 8 described below.

In order to maximise the power that the wind system 1 of the present invention must be able to subtract from wind W, it is preferable to use, for each module 5, many kites 2 mutually connected in series to form a train 3 of kites 2, in order to sum the pull on ropes 4. In such a way, the wind front area W that each module 5 is able to intercept is greater. This results in an increase of the dragging effect that translates the module 5 and consequently in an increase of the electric energy that can be generated at every operating cycle. Every train 3 of kites 2 is connected to module 5 through a single system of ropes 4: consequently, the operating principle of the wind system 1 does not depend on the number of kites 2 connected in series in a train 3. Such a multi-layer configuration not only increases the intercepted wind front area W, but, if made as a single object or a suitably aggregated object, also provides the chance of improving the aerodynamic efficiency. The ropes 4 can in fact be integrated into the "walls" of the kites 2 (not shown in the Figures) or the walls themselves of the kites 2 can be the connecting element between kites 2 (not shown in the Figures), in turn exposing an airfoil section and keeping the assembly geometrically stable. This allows removing the ropes 4 (and therefore the drag opposed by them) in the maximum system speed area. In order to obtain this result, the kites 2 can assume an arc shape in which the end walls extend to connect to the other kites 2, or shapes that tend to approximate plane wings with one or two connecting walls.

Herein below, for completeness, reference will be made to the case in which the wind system 1 has a train 3 of kites 2 for each module 5. The number of overlapped kites 2 can arbitrarily increase. Moreover, by keeping the global area constant, upon increasing the number of kites 2 composing a single train 3, the kite size decreases. This makes kite recovery and expulsion manoeuvres easier, as will be seen afterwards in more detail. An embodiment of the wind system 1 according to the present invention provides that the kites 2 belonging to the same train 3 not all have the same sizes. The kites 2 in the top part of the train 3 have dimensional relationships and relative aerodynamic efficiencies different with respect to the kites 2 in the bottom part. The kites 2 nearest to the module 5 are thereby characterised by a larger area and the kite sizes decrease by proceeding towards the upper end of the train 3. This configuration is adopted because the farther away a kite 2 is from the module 5 to which it is constrained through the rope 4, the greater its speed during its flight. Therefore, by proceeding from the lower end to the upper end of a train 3 of kites 2, it is possible to compensate the flight speed increase of the kites 2 by progressively reducing their surface. In such a way, the power subtracted from the wind W is the same for each kite 2 of the same train 3.

The wind system 1 according to the present invention comprises traction ropes 4 adapted to transmit forces from and to the kites 2 and used for dragging the modules 5 for converting energy and for checking the flight trajectory of the kites 2 themselves. The traction ropes 4 are an element that must be accurately sized since a possible oversizing would unavoidably bring about an increase of their aerodynamic resistance. An embodiment of the wind system 1 according to the present invention provides that the ropes 4 have a variable section (not shown in the Figures). In particular, the rope section, next to the modules 5 of the wind system 1 (namely the sections of ropes 4 subjected to continuous power manoeuvres and in contact with systems adapted to perform such manoeuvres and described below) have a greater size with respect to the section of the ropes 4 next to the trains 3 of kites 2. This allows obtaining a greater wear resistance. The size variation of a section could be continuous or stepped with offsets. In order to further reduce the drag of sections of ropes 4 subjected to greater speeds (namely the lengths of rope 4 next to the trains 3 of kites 2), the section of the ropes 4 next to these lengths can, for example, be aerodynamically modelled according to a kite that generates a slight asymmetric lift, avoiding turbulences and oscillating phenomena. Such result can be obtained, for example, by coating the ropes 4 with a star-section extruded sheath (not shown in the Figures): in this way, the star projections of the sheath are deflected by wind W till a kite approximation is realised. In case of oscillating engagement, the projections generate a mutual friction in order to absorb stationary energy, thereby dampening the oscillation.

The wind system 1 according to the present invention further comprises at least one module 5 that translates on at least one rail 6, for example by means of wheels 16, 17 or by magnetic levitation, adapted to drive the kites 2 and to convert wind current energy into electric energy. The modules 5 are placed next to the ground and each module 5 is connected to a train 3 of kites 2 through at least one rope 4 adapted to transmit forces from and to the kites 2 and used for dragging the module 5 for converting energy and for controlling the flight trajectory of the kites 2 themselves.

With reference to the Figures, it is possible to note that every module 5 of the wind system 1 comprises at least one trolley 11 through which the module 5 translates at least on the rail 6. The shape of the trolleys 11 of the modules 5 of the wind system 1 is preferably aerodynamically modelled, in order to minimise the resistance opposed to air when operating the wind system 1.

Each module 5 is equipped with all necessary components for the automatic driving of the kites 2 and for generating electric energy. The conversion of mechanical energy into electric energy occurs, for example, through generators 20 and/or 21 directly connected to wheels 16 and 18 rotated due to the effect of the drag of the modules 5 on the rail 6 composing the electric generating system. As an alternative to the actuation of the generators 20 and/or 21 by means of wheels 16, the conversion of mechanical energy into electric energy can occur by reversibly employing linear magnetic motors (not shown in the Figure). Every module 5 therefore appears as a generator able to deliver power independently from the other modules 5.

The wind system 1 of the present invention further comprises a smart control system operating on each module 5 and through which the flight of the kites 2 is automatically controlled, and a supply system cooperating with such smart control system to manage accumulation and delivery of electric energy produced by generators 20 and/or 21 during the module 5 translation along the rail 6 under the effect of dragging by the kites 2 to which it is connected through the ropes 4.

For every module 5, the smart control system drives the train 3 of kites 2 in order to exploit the dragging effect in order to make the module 5 move on a closed path. In particular, the smart control system cooperates with a set of sensors with autonomous supply placed on kites 2 that send information, preferably in wireless mode, to ground components of the smart system. The smart control system integrates these information with other information coming from a set of ground sensors (for example the value of the ropes 4 load determined by reading the pairs of motors 28 mentioned below in more detail) and perform a processing to automatically drive the kites 2 when the wind system 1 operates.

As regards driving of the kites 2, the wind system 1 according to the present invention provides for two modes.

The first mode consists in using the power ropes as driving ropes. Each train 3 of kites 2 is therefore connected to the corresponding module 5 through a pair of ropes 4. Such ropes 4 firstly allow dragging the module 5 (and therefore generating electric energy) due to the transmission of the mechanical energy subtracted from the wind currents W. The same ropes 4 are further unwound and rewound on suitable winches 24 and 25 in order to drive the train 3 of kites 2.

The second driving mode consists in using spoilers (not shown in the Figures) placed on board the kites 2. Through such spoilers it is possible to create turbulences that give rise to pressure gradients through which the kites 2 are driven. The above spoilers can be actuated, for example, through piezoelectric systems, shape-memory polymers and/or fibres of shape-memory metal alloys, whose distortions are actively checked. Such system has an autonomous supply or can be supplied through cables (not shown) that from the module 5 reach the kites 2. The controls for actuating the spoilers are preferably sent in wireless mode by the smart control system. By using the spoilers, it is possible to drive the kites 2 without necessarily having to employ the ropes 4. In such case, namely, the system that takes care of manoeuvring the kites 2 is on board them and a train 3 of kites 2 can be connected to the corresponding module 5 by means of a single rope 4, exclusively used for transmitting the load and allowing to drag the module 5.

Driving of the kites 2 can also occur by adopting both above-described modes.

Summarising, in order to drive and obtain traction from the kites 2, there are different approaches whether there are one or more driving ropes 4. The single rope 4 demands the chance of performing manoeuvres to actuating systems on board the kites 2, being limited to transmit the traction; two ropes 4 instead overlap the driving function to the traction function.

By increasing the number of ropes 4, it is further possible to add driving functions as correction of the attack angle of the kite 2, safety functions and quick spilling functions. Therefore, in case of driving through the ropes 4 (with or without the support of spoilers), every train 3 of kites 2 must be connected to the corresponding module 5 through a pair of ropes 4. In case of driving exclusively through spoilers, instead, there is a single rope 4 that operates as connecting element between the train 3 of kites 2 and the module 5. In such case, therefore, the number of module 5 components that drive or store the ropes 4 is reduced, greatly simplifying the wind system 1 structure.

Herein below, reference will simply be made to the case in which, in the wind system 1 according to the present invention, driving of the kites 2 occurs by means of a pair of ropes 4. For each component of the wind system 1 analysed in detail below, anyway there will be pointed out simplifications that it is possible to introduce in case of use of a single rope 4 for dragging each module 5.

Even if limiting the number of ropes 4 is advantageous from an aerodynamic point of view, the solution with two ropes 4, in addition to mere driving and traction, also provides the chance of performing emergency manoeuvres. The directional driving is typically obtained with a limited differential variation of the length of the due ropes 4, but is the differential variation of the due ropes 4 exceeds the wing opening of the kites 2, there occurs a situation in which the lift, defined herein below as "wing sideslip", is cancelled. Under this condition, should the need occur of a quick return, it is possible to quickly rewind the ropes 4 without wasting energy. During such quick descent, due to the effect of the wing sideslip, there is however the risk of spinning of the kite 2 with substantial loss of control. In order to prevent such loss of control, it is possible to provide the kites 2 with aerodynamic devices and arrangements that allow easily stopping the quick descent once having reached the desired height and correctly restore the regular and productive flight condition. In the wing sideslip steps, the side edge of a kite 2 becomes attack edge and houses both the position tracing instruments in the three-dimensional space and an actuating and stabilising system of the sideslip manoeuvre (not shown in the Figures). Said actuating and stabilising system is, for example, characterised by directional sponsons and spoilers controlled by the smart control system.

Under regular flight conditions, the directional sponsons are transverse to the thrust direction and are flexed disappearing in order not to modify the kite 2 efficiency. When wing sideslip, the directional sponsons are lifted, actuated by the flow that appears in the right direction. The directional sponsons therefore concur in re-balancing the penetration of the kite 2 when it is improperly used in the wing sideslip passively improving the manoeuvre stability. A further stabilisation arrangement is actively obtained with the spoilers/spoiler (already previously mentioned) suitably placed and geometrically actuated by a logic that uses directly, or through the ground control, information of flight tracing sensors, in order to counterbalance the trend to spinning.

The actuating and stabilising system of the sideslip manoeuvre allows immediate height corrections/reductions of the kite 2 when descending and, once having reached the required height or elongation of the ropes 4, restoring the lift by returning to a differential length of the ropes 4 compatible with the normal flight.

In the wind system 1 according to the present invention, the application of the actuating and stabilising system of the sideslip manoeuvre mainly consists in the quick and controlled disengagement of an area in the aerial space.

The wind system 1 according to the present invention further comprises at least one recovering system 8 for the kites 2: in the following description, the wind system 1 will be described according to two preferred embodiments, provided as a non-limiting example: such embodiments are mostly distinguished due to the modes in which the recovering systems 8 of the kites 2 are supported.

According to a first embodiment, the wind system 1 of the present invention comprises at least one module 5 comprising a single trolley 11 next to which both energy converting generators 20 and/or 21 and system components for driving the kites 2 are placed. With reference to FIGS. 5 to 9, it is possible to note that the recovering systems 8 are constrained to the modules 5 of the wind system 1 next to an end. The weight of the recovering systems 8 is supported through a stretched flexible structure 12 composed of tie-rods 14 constrained in an end thereof to the recovering systems 8 and in another end thereof to a vertical structure 13, for example a trellis, with which each module 5 is equipped. The stretched flexible structure 12 further connects each module 5 of the wind system 1 with at least two, possibly adjacent modules 5. By mutually connecting the different modules 5, should the dragging effect lack on a module 5, such module 5 would be dragged by the other modules 5 of the wind system 1 for which the dragging effect is present. This allows avoiding (or possibly delaying) the actuation of the generators 20 and/or 21 used for producing electricity as motors, to allow advancing the module 5 and described in more detail below.

According to such embodiment, the recovering systems 8 can also be equipped, for example, with cushioned wheels 17 through which they rest onto secondary rails 7. In such a way, the weight of the recovering systems 8 is not completely supported by the system of tie-rods 14 but is partly discharged to the ground.

An embodiment of the whole wind system 1 with flexible structural stretched techniques that accurately joins elements working in compression with systems of traction ropes, divides and dilutes forces and transients of each train 3 of kites 2 on the whole wind system 1, introducing a cooperation between the single modules 5 and reducing the need of over-sizings.

The form that the stretched flexible structure 12 can assume as a whole is the subject of a careful simulation analysis, but the types are composed as a trend of triangular sections developed by following a cylindrical symmetry, ideally similar to a straw hat or a cup (not shown in the Figures).

Among the stresses that the stretched flexible structure 12 must support, there is the traction component of the kites 2 in a tangential direction, the one that actually produces energy. As previously stated, the stretched flexible structure 12 must however also support the weight of the recovering systems 8, a particularly severe component above all when there are no secondary rails 7 and under the stop situation of the wind system 1 (when the systems 8 are not supported or enlightened by the vertical component of the pull of the kites 2). Under this condition, all the system 8 weight is statically supported by the stretched flexible structure 12 whose geometric configuration comprises a ring (not shown in the Figures) that follows the closed path of the wind system 1. Such ring can follow interlaced behaviours with respect to the various modules 5.

A second embodiment of the wind system 1 according to the present invention comprises at least one module 5 equipped with at least two trolleys 11 that travel on parallel rails 6 placed, for example, at different heights. With reference to FIGS. 10 to 14, it is possible to note that, according to such embodiment, for each module 5 the recovering system 8 is constrained to the two trolleys 11. A trolley 11 is placed next to the end of the recovering system 8 from which the ropes 4 go out towards the kites 2, and is equipped with the generators 20 and/or 21 through which the energy conversion occurs. Another trolley 11 is placed next to the other end of the recovering system 8 and is equipped with the other components that take care of driving the kites 2 and storing the ropes 4. As stated also for the previous embodiment, the recovering systems 8 can also be equipped, for example, with cushioned wheels 17 through which they rest on secondary intermediate rails 7 that contribute to the support of the recovering system 8 (not shown in the Figures). It is possible to provide both trolleys 11 with a module 5 of the generators 20 and/or 21 for producing electricity. Herein below, reference will be made to the case in which, for every module 5, the generators 20 and/or 21 are placed on a single trolley 11, according to what has been previously stated. Placing the rails 6 on which the trolleys 11 travel at different heights allows slanting the recovering systems 8 with respect to the ground towards the train 3 of kites 2, in order to provide less resistance to the ropes 4 when the wind system 1 operates. Also this embodiment provides for a stretched flexible structure 12 to connect each module 5 of the wind system 1 with at least the two adjacent modules 5. By mutually connecting the different modules 5, should the dragging effect lack on a module 5, such module 5 would be dragged by the other modules 5 of the wind system 1 for which the dragging effect is present.

In both above-described embodiments, the recovering system 8 of the kites 2 is integrated by a system for recovering and expelling (not shown in the Figures) them. The pair of ropes 4 connected to the train 3 of kites 2 crosses the recovering system 8 and goes on a transmission system equipped with at least one system for absorbing the force peaks (not shown in the Figures) of the ropes 4 and with at least one system for providing friction (not shown in the Figures) to the ropes 4, which drives the ropes 4 towards a winding and unwinding system 22 comprising at least one pair of four winches 24 to drive the train 3 of kites 2, and a storing system 23 of the ropes 4 composed of at least one pair of winches 25. Each winch 25 of the storing systems 23 is equipped with a driving module 26 that compels the rope 4 to be orderly wound onto its respective winch 25.

The ropes 4 are then the connecting and force-transmitting element between kites 2 and modules 5 of the wind system 1. When a train 3 of kites 2 is lifted by the wind W, a dragging effect is generated, that creates the module 5 translation and, consequently, the conversion of wind energy into electric energy through the generators 20 and/or 21. Obviously, length and diameter of each rope 4 depend on wind conditions and safety in which one has to operate.

The wind system 1 according to the present invention further comprises at least one rail 6 on which the modules 5 translate dragged by kites 2. As previously stated, the modules 5 of the wind system 1 can translate on many rails 6 and 7, in order to distribute the weight of the recovering systems 8 of the kites 2.

The rails 6 and 7 preferably describe a closed path. The simplex path is circular, but it is suitable to choose the path in order to optimise the exploitation of the wind energy. For example, supposing to realise the wind system 1 in an area in which wind W mainly blows along one direction, it is convenient to make the modules 5 of the wind system 1 describe an elliptical path, with its major axis perpendicular to the direction along which wind W blows. Such choice is dictated by the fact that the traction of the modules 5 of the wind system 1 by the kites 2 occurs by exploiting the force lift component that is generated when the wind currents meet the kites 2, as better specified below.

If the rails 6 and 7 describe a closed path, the modules 5 of the wind system 1 are subjected to a centrifugal radial force due to the motion of the modules 5 and to the radial component of the pull of the train 3 of kites 2. In order to counteract such force, it can be convenient to suitably slant the rails 6 of the wind system 1 (not shown in the Figures). Slanting of the rail 6 can be easily deduced and sized by decomposing the forces that operate on the wheels 16 of the modules 5. Obviously, if the wind system 1 modules 5 translate on many rails 6 and 7, such rails 6 and 7 must be parallel and concentric.

Preferably, the rails 6 and 7 are not placed on the ground, but are kept lifted by means of pillars. By keeping the modules 5 at a suitable height, there is no risk of sliding the kites 2 on the ground if the kites 2 accidentally precipitate. The structures supporting the rails 6 and 7 must have a big inertia, in order to ensure a high stability and satisfy the geometric accuracy requirement required by the trolleys 11 of the wind system 1.

As previously stated, if the wind system 1 has many rails 6 and 7, it is convenient to place the rails 6 at different heights in order to keep the recovering systems 8 slanted with respect to the ground, towards the trains 3 of kites 2. This reduces the resistance opposed to the ropes 4 by the recovering systems 8 when the wind system 1 operates.

The rails 6 and 7 with which the wind system 1 is equipped can be divided into two categories. It is possible to locate main rails 6 and secondary rails 7. The main rails 6 are the rails on which the trolleys 11 of the modules 5 of the wind system 1 translate. The secondary rails 7 are the guides on which the cushioned wheels 17 translate and contribute to support the weight of the recovering systems 8 of the kites 2.

The rails 6 and 7 of the wind system 1 of the present invention can be classic or magnetic, depending on the fact that the modules 5 of the wind system 1 exclusively travel by means of wheels 16, 17 or through magnetic levitation. In particular, secondary rails 7 are preferably of the classic type while main rails 6 can also be magnetic.

Classic main rails 6 have such a shape that they "embrace" the lower part of the trolleys 11 that travel thereon. As will be better described below, the trolleys 11 of the modules 5 of the wind system 1 that travel on classic rails 6 are equipped with three groups of wheels 16. By focusing the attention on a single module 5, a group of wheels 16 must support the majority of the weight of the module 5 along the vertical direction; the other two groups of wheels 16 contribute to prevent the module 5 from overturning due to the centrifugal force effect. Classic main rails 6 are realised in order to allow the wheels 16 to roll on two horizontal planes (a lower plane and an upper plane) and on a vertical plane. For such purpose, the section of the rails 6 assumes, for example, the appearance of two facing "Cs" next to its concave part, as shown in particular in FIG. 12. Such configuration instead is not necessary next to the secondary rails 7 if they are exclusively of the classic type, whose function consists only in contributing to support the recovering systems 8 of the kites 2. The cushioned wheels 17 in fact roll on a single plane and the rails 7 appear as common guides.

As an alternative to the double-"C" configuration, it is also possible to make classic main rails 6 that have, for example, a rectangular section, for example, and instead arrange the groups of wheels 16 of the trolleys 11 of the modules 5 of the wind system 1 in such a way as to embrace the rail 6 (not shown in the Figures).

Another alternative embodiment finally consists in performing a high-low sense reversal of the rail 6 with respect to the wheels 16, namely have the wheels integral with the ground and the rail dragged by the kites 2, in order to house on the fixed part all alternators keyed on the wheels (not shown in the Figures). The advantage offered by such embodiment resides in the simple electric connection without needing manifold or sliding contacts.

In case of use of classic main rails 6, as better described below, the energy conversion can occur, for example, through generators 20 directly actuated by the rotation of the wheels 16. However, in case of delivery of high powers by each module 5, the classic rails 6 could not be suitable for allowing the actuation of the generators 20 by rotating the wheels 16. The torque to be transmitted to generators 20 could in fact be too high to be generated by simply exploiting the rolling friction between rail 6 and wheels 16, and the rolling resistance could be such as to imply sliding of the wheels 16 on the rail 6. In such case, having anyway to generate current without recurring to linear motors used reversibly, to avoid dissipations and allow converting mechanical energy into electric energy, it is possible to provide the classic rail 6 with at least one rack 15 on which at least one toothed wheel 18 meshes and directly actuates a generator 21. As better described below, in such case, the wheels 16 of the trolleys 11 mainly perform a supporting function. The rack 15 is placed on the classic rail 6 in order to have its toothed surface perpendicular to the surface of the rail 6 and oriented towards the centre of the closed path described by the rails 6. The toothed wheel 18 that meshes with and rotates on the rack 15 is horizontally placed and, due to this configuration, opposes the centrifugal force. The centrifugal force to which each module 5 is subjected is then exploited (and at the same time contrasted) to guarantee a good unwinding of the toothed wheel 18 on the rack 15.

Should the magnetic levitation be used, the main rails 6 are equipped with electromagnets and are made in order to allow magnetic suspension and/or energy conversion through linear motors reversibly used for generating electricity, as better described below. As regards magnetic levitation, remember that currently three technologies can be adopted:

electromagnetic suspension: levitation is obtained by using conventional electromagnets (possibly cooled at their super-conduction point) placed at the end of a pair of structures of the trolley 11 that are wound onto the sides and lower part of the rail 6. The magnets are attracted towards the rail 6 and in such a way they support the trolley 11;

electro-dynamic suspension: levitation is obtained by using electromagnets cooled at their super-conduction point placed on trolley 11. Next to the side walls of the rail 6, there are "eight"-shaped windings in which the magnetic field generated by semiconductor windings placed on the trolley 11 induces currents due to the effect of which opposite magnetic poles are created next to each half of the "eight". Magnetic poles at a higher level attract the magnetic field of the semiconductors of the trolley 11, magnetic poles at lower level repel them. Such combination of attraction and repulsion allows the trolley 11 to levitate;

suspension through permanent magnets: levitation is obtained by placing permanent magnets on the trolley 11 and unsupplied electromagnets on the rail 6. When the trolley is in motion, the permanent magnets induce in rail 6 electromagnets currents that generate a repelling magnetic field with respect to the one produced by permanent magnets. Such repulsion makes the trolley 11 levitate.

In the wind system 1 according to the present invention, in case of use of magnetic levitation, the used technology is preferably the one that provides for the magnetic suspension through permanent magnets that can be summed with the flow generated by superconductor solenoids. The configuration of magnets and electromagnets on the rail 6 and on the trolleys 11 of the modules 5, and the principle through which magnetic levitation is obtained, will be described in detail below, together with the modes with which energy conversion, and therefore current production, is obtained.

As can be better stated below, even in case of use of magnetic levitation, it is advisable to provide the trolleys 11 of the modules 5 of the wind system 1, with wheels 16 that contribute to keep the air gap between the magnets of the modules 5 and the rails 6. The wheels 16, that are exclusively used for keeping the air gap, are, for example, similar to the three groups of wheels 16 of the trolleys 11 that travel on classic main rails 6, mentioned previously. In case of use of magnetic levitation, the main rail 6 can therefore be a combination between an above-described classic rail (with double "C" configuration or with an alternative configuration) and a magnetic rail.

Every module 5 of the wind system 1 is therefore equipped with at least one trolley 11 through which the module 5 translates on at least one rail 6. In particular, as already stated previously, the modules 5 can be equipped with a single trolley 11 on which both generators 20 and/or 21 and components for driving the kites 2 and storing the ropes 4, are placed. A second embodiment consists in providing each module 5 with two trolleys 11: one at a higher height equipped with components that perform the energy conversion and one at a lower height on which winches 24 and 25 are placed, on which ropes 4 are wound.

The modes with which a trolley 11 can travel on a rail 6 are preferably two:

in case of use of a classic rail 6, the trolley 11 translates on the rail 6 by means of smooth wheels 16 and 17;

in case of use of magnetic rail 6, the trolley 11 translates on the rail 6 by means of permanent magnets and/or electromagnets, exploiting the magnetic levitation principle.

If a trolley 11 translates on a rail 6 by means of wheels 16, such wheels 16 are interfaced to the remaining part of the module 5 of the wind system 1, for example through springs coupled in parallel with dampeners. The module 5 is therefore shock-absorbed.

As already previously states, it is possible to divide the wheels 16 with which the trolley 11 is equipped, with a module 5 into three groups. The wheels 16 belonging to different groups are mutually placed perpendicular, with a "T"-shaped configuration. In particular, supposing that the rails 6 lay on a horizontal plane, there are:

wheels 16 rolling on a horizontal plane, that support the majority of the trolley 11 weight;

wheels 16 rolling on a vertical plane, that counteract the radial force to which the trolley 11 is subjected;

wheels 16 rolling on a horizontal plane, that prevent the trolley 11 from overturning.

Due to the presence of this system of wheels 16, a trolley 11 is kept in the bed of the rail 6, preventing any change of derailing. Such result is obtain by conferring a suitable shape to the classic rail 6. In particular, as previously stated, it is possible to make the rail 6 so that is assumes a double-C"C section, so that the rail 6 "embraces" the lower part of the trolley 11. Alternatively, it is possible to use a common rail, for example with a rectangular section, and arrange the wheels 16 on the trolley 11 so that the same wheels 16 embrace the rail 6 (not shown in the Figures).

Independently from the adopted embodiment, the single wheels 16 are not directly constrained to the flatbed of the trolley 11 but are joined in trolleys 19 in turn constrained to the above flatbed. Such solution, also adopted in railway transports, confer more stability to the system.

In case of use of magnetic rail 6, the air gap between magnets of the module 5 and electromagnets of the rail 6 is extremely reduced and there is a high risk that module 5 and rail 6 come in contact. This is due both to the high mass of the modules 5 of the wind system 1 of the present invention, and to the type and amount of stresses to which such modules 5 are subjected. To guarantee keeping the air gap, it is advisable to provide the magnetic levitation trolleys 11 also with wheels 16 that exclusively perform a support function of the module 5, without concurring in generating electric energy. Such wheels 16 can, for example, be identical to those with which a trolley 11 translates on a classic rail 6. As previously stated, in case of use of magnetic levitation, the rail 6 on which the modules 5 translate, can therefore be a combination between a classic rail and a magnetic rail.

In addition to keeping the air gap, the use of supporting wheels 16 can anyway be necessary in case of use of a suspension for permanent magnets as magnetic suspension technology. By adopting this technology, the repelling magnetic field could in fact be generated only under motion conditions and therefore, under such hypothesis, levitation with an unmoving module 5 would not be possible. The presence of the supporting wheels 16 ensures that, even when there is no levitation, modules 5 and rail 6 do not come in contact. Conditions for a possible forced movement of the module 5 without a magnetic suspension are further better.

The recovering systems 8 are the components of the modules 5 of the wind system 1 used for recovering the kites 2 at rest. The wind system 1 is equipped with one recovering system 8 for each module 5. The recovering system is preferably made as at least one cylindrical pipe aimed to house therein a whole train 3 of kites 2. For this reason, the recovering systems 8 are among the most encumbrant and heavier components of the wind system 1. The recovering systems 8 could be designed in order to gravitationally react, with their own weight, against the vertical traction component of the kites 2. Though the vertical pull component of the kites 2 gives a contribution to supporting the weight of the recovering systems 8, it is advisable to design the modules 5 of the wind system 1 in order to prevent that the weight of the recovering systems 8 makes the modules 5 overturn. This is made necessary also by the fact that the vertical pull component of the kites 2 is present only when the wind system 1 operates. When the wind system 1 is at rest, instead, the whole weight of the recovering systems 8 rests on the rails 6.

In case of use of a single trolley 11 for each module 5, the recovering system 8 is constrained to the trolley 11 next to the end from which the ropes 4 enter proceeding towards the kites 2. To avoid that the recovering system 8 makes the module 5 overturn, the weight of such system 8 is therefore supported through the stretched flexible structure 12 and possibly the cushioned wheels 17 connected to the recovering system 8 that travel on secondary rails 7.

If the modules 5 of the wind system 1 are equipped with two trolleys 11 for each module 5, the recovering system 8 is constrained to such trolleys 11 next to the end. The most internal rail 6 is therefore placed at a lower height so that the recovering system 8 is suitably slanted, to minimise the resistance opposed to the ropes 4 when the wind system 1 operates. In particular, the recovering systems 8 are slanted with respect to the horizontal plane upwards (as shown in particular in FIGS. 6 and 11). Such slanting is realised also in case of use of a single trolley 11 for each module 5, for example by placing at decreasing heights the secondary rails 7 on which the cushioned wheels 17 supporting the recovering system 8 travel.

Independently from the use of one or two trolleys 11 for each module 5, the end part 10 of the recovering systems 8 is realised in order to be able to be oriented both in the horizontal plane and in the vertical plane. This allows facilitating the recovery and expelling operations of the kites 2 and partially absorbing the force transients. In particular, by increasing the slanting of the end part 10 of the recovering systems 8 with respect to the horizontal plane during the expelling operation of the kites 2, it is possible to place the upper end of the systems 8 at a height that greatly modifies, by elongating it, the necessary time for the kites 2 to settle when flying, the kites 2 starting from a higher height. During the kites 2 recovering operations, the end part 10 of the recovering system 8 is aligned to the remaining part of the system 8, in order to facilitate executing such operation.

The capability of the end part 10 of a recovering system 8 to be oriented is obtained, for example, by making at least one articulated joint 9 next to the upper end of the system 8 and driving the end part 10 over the articulated joint 9 through a system of three ropes 31 each constrained to at least one hydraulic cylinder 32 hinged to the recovering system 8 next to the articulated joint 9. These hydraulic cylinders 32 are actuated by a hydraulic system driven by the smart control system. As alternative to the hydraulic cylinders 32 it is possible to use linear electromechanical modules (not shown in the Figures).

If the modules 5 of the wind system 1 are equipped with two trolleys 11 for each module 5, the trolley 11 next to the outlet edge of the recovering system 8 is constrained to the part that is not able to be oriented of the system 8, upstream of the articulated joint 9.

If the wind system 1 according to the present invention is equipped with a single trolley 11 for each module 5, a possible embodiment of the wind system 1 (not shown in the Figures) provides that it is not necessarily only the end part 10 of the recovering systems 8 to be able to be oriented. The articulated joint 9 that allows orienting can be placed in any point of the recovering system 8 or in the system 8 origin, making the whole system 8 able to be oriented. Also in this embodiment, the end part 10 of the recovering systems 8 can be driven, for example, through a system with ropes and hydraulic cylinders. If it is the whole recovering system 8 to be able to be oriented, the manoeuvre can occur through the stretched flexible structure 12 that supports it.

In order to facilitate passing the train 3 of kites 2 during their recovery and launch, the outlet edge of the recovering systems 8 is preferably dome-shaped and, next to such outlet edge, the end part 10 of the recovering systems 8 has an increasing section proceeding towards the outlet edge.

The function of preserving the kites 2 imposes that the recess of the recovering systems 8 is accessible to operators for performing possible maintenances.

The shape of the recovering systems 8 can be merely cylindrical, but, if evaluations about aerodynamic rotation resistance and structural resistance should suggest a different approach, the recovering systems 8 could be made with a trellis structure (not shown in the Figures) where accessibility and containment of kites 2 are obtained through a network for padding the trellis walls. The minimum trellis section is triangular, keeping an adequate space for preserving the kites 2 and passing the ropes 4. The particular entanglement of the padding network avoids possible jamming when sliding the train 3 of kites 2 during expulsion and recovery steps.

Inside each system 8, a system is placed by means of which expulsion and recovery of kites 2 occur, together with accompanying the ropes 4.

The system 2 for recovering and expelling the kites 2 is a component of the module 5 of the wind system 1 placed inside the recovering system 8 and through which recovery and launch of the kites 2 occur, respectively when the wind system 1 is stopped and started.

The wind system 1 according to the present invention can be equipped, for example, with the same recovery and expulsion systems with which the wind system with arms and rotating shaft is equipped, disclosed in previously-mentioned Italian patent application n. TO2006A000491, to which reference can be made for a more detail explanation.

Synthetically, each of these recovery and expulsion systems is equipped with a trolley that translates on two rails that compel it to translate inside the corresponding recovering system 8 and in parallel with the axis of such system 8. A pair of systems of output pulleys 35 of the ropes 4 are assembled on the trolley. In case of use of a single rope 4 as interconnection member between the module 5 of the wind system 1 and the train 3 of kites 2, there is a single system of output pulleys 35 of the rope 4 assembled on said trolley.

Upon recovering the train 3 of kites 2, when the kites 2 are next to the recovering system 8, the kites 2 are arranged in parallel with the axis of the recovering system 8 (through the pair of ropes 4 and/or the spoilers) in order to facilitate entry in such system 8.

Making launch and recovery of the kites 2 easier can be obtained with jets of compressed air suitably blown for expelling and handling the kites 2 without needing contacts. The devices for obtaining this artificial wind thrusts (not shown in the Figures) can be arranged on the length of the recovering systems 8 and in the end part 10. The manoeuvres are generated through numerous blowing points whose geometric position must enable quite a number of degrees of freedom, and are driven by the smart control system in order to realise an accurate and agile handling device.

The same artificial wind thrust devices can help recovering the train 3 of kites 2. Through these devices in fact it is possible to create artificial air flows with which the drivability of the kites 2 is guaranteed when said kites 2 are next to the recovering systems 8.

The launch of the kites 2 requires at least the presence of a slight breeze at ground level. In case of scarce wind at low heights, the motors 20 mentioned below are actuated in order to start the modules 5 of the wind system 1 in order to artificially create the breeze that allows the kites 2 to ascend.

The wind system 1 is equipped with a recovery and expulsion system of the kites 2 next to each module 5.

An alternative solution as regards the recovery of the kites 2 consists in placing the recovering systems 8 on the ground instead of on board the modules 5 of the wind system 1. Such solution implies great advantages. First of all, every module 5 of the wind system 1 is equipped with a single trolley 11 (since the external one adapted to support the recovering system 8 is not necessary any more) and the wind system 1 will therefore have a single rail 6. Another advantage consists in that the inertia of each module 5 is highly reduced with respect to the solution with recovering systems 8 integral with modules 5 and therefore the energy to be spent upon starting the wind system 1 is lower. Finally, the aerodynamics of the trolleys of the wind system 1 is better, since the aerodynamic friction due to the recovering systems 8 is not present any more. This allows increasing the energy conversion efficiency with the same wind energy captured by the kites 2.

The recovering systems 8 on the ground can be, for example, containers with a hinged cover placed next to the ground. Said containers have a shape adapted to house at least one train 3 of kites 2. In the horizontal plane the recovering systems 8 are radially arranged and can be placed inside and outside the closed path located by the rail 6. As regards slanting of the recovering systems 8 with respect to the ground, during the kites 2 recovery and takeoff operations, the recovering systems 8 are slanted upwards (in order to facilitate such operations), while during the remaining period of time, the recovering systems 8 are arranged almost horizontally. In particular, each recovering system 8 is able to perform two movements: a rotation-translation movement and a housing movement.

Figure 18:
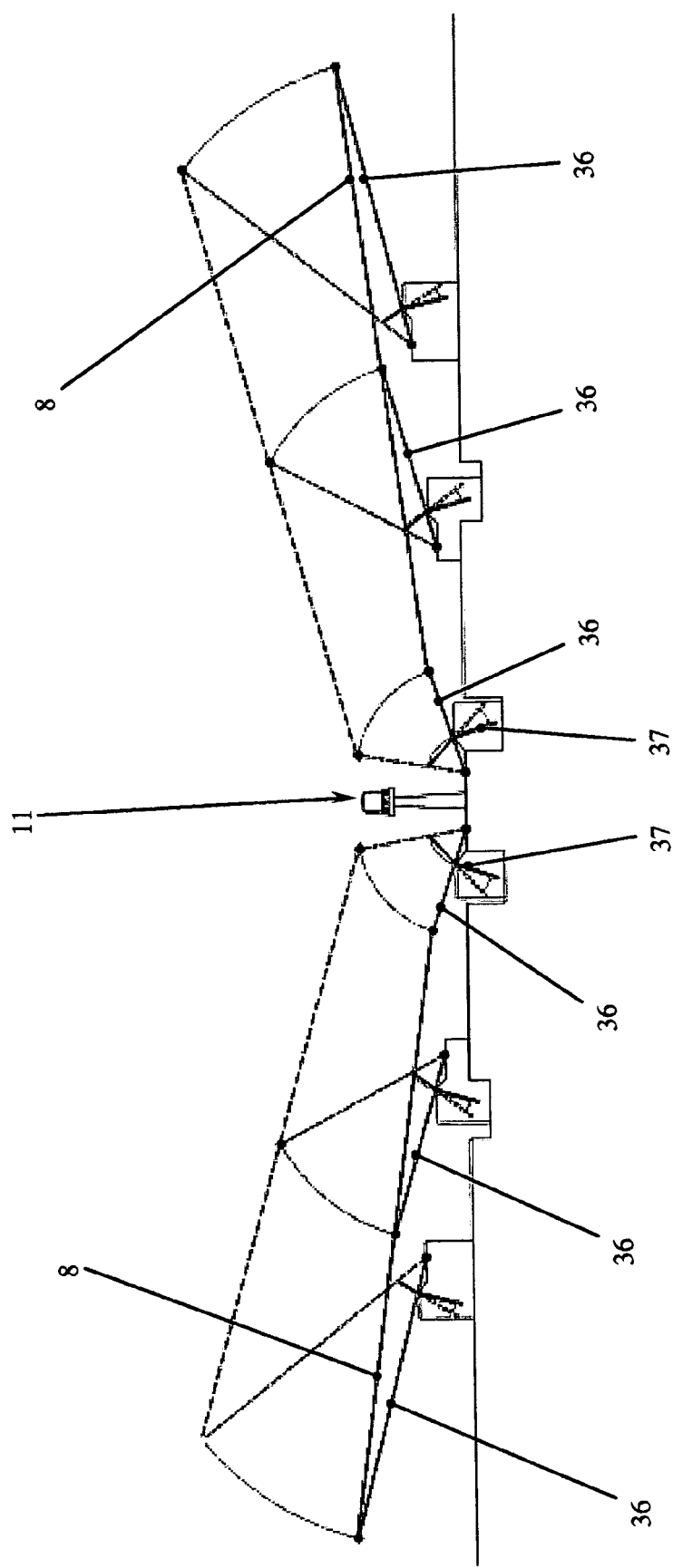
FIG. 18 shows a schematic view of another preferred variation of the wind system according to the present invention in two of its operating steps.
Figure 19:
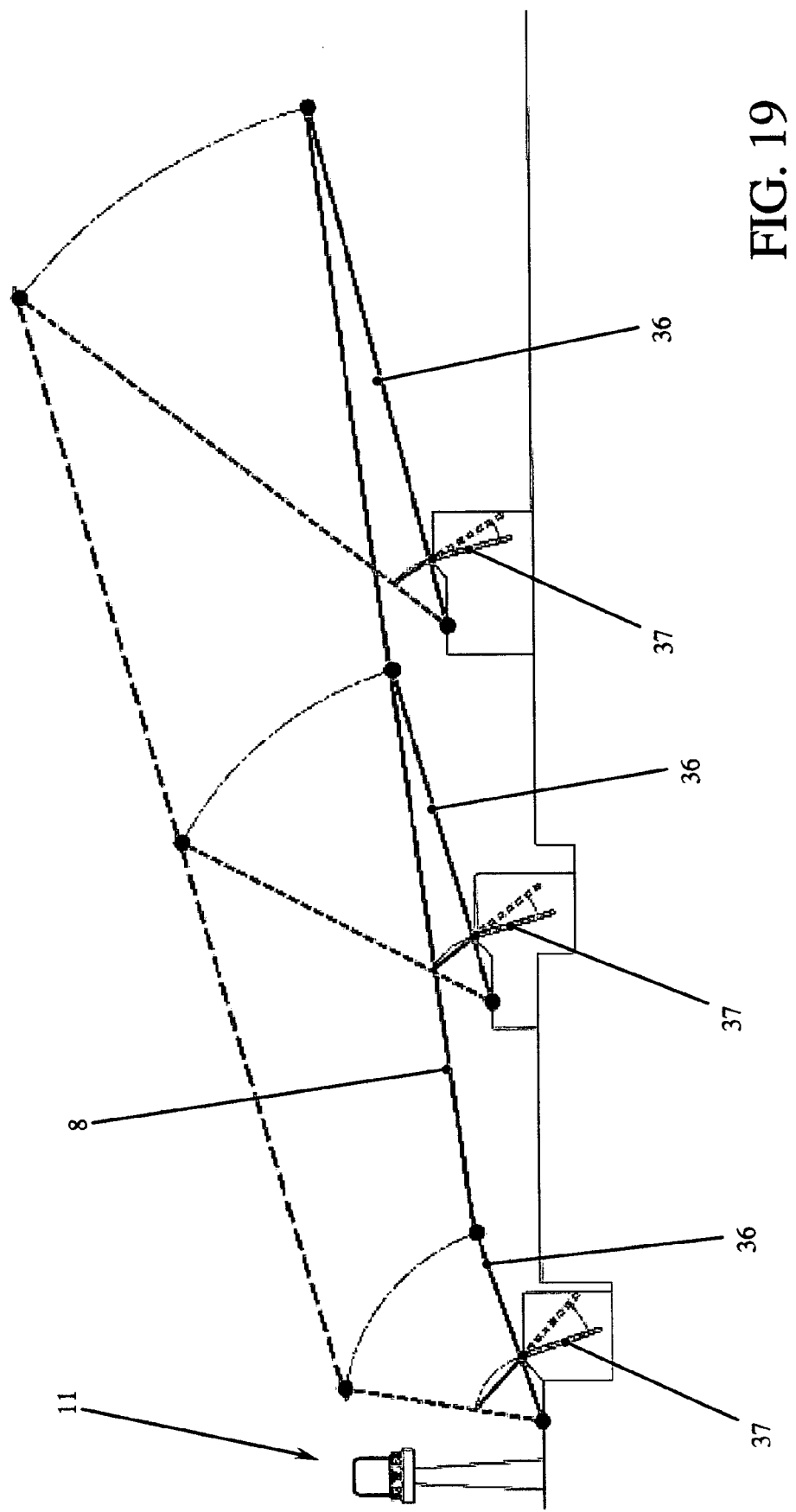
FIG. 19 shows an enlarged schematic view of the system of FIG. 18.

The rotation-translation movement consists in lifting the recovering system 8 by suitably slanting it upwards. Each recovering system 8 is handled through laterally-arranged linear actuators 37. Such actuators 37 are arranged on the two sides of the recovering system 8 and are hinged both on the ground and to structures that can be schematised through rods 36 in turn hinged next to the ground end and to a box 38 of the recovering system 8 (as shown in FIGS. 18 and 19). By actuating the actuators 37, it is possible to lift and slant the recovering system 8 taking the nearest end to the rail 6 at the same height at which said rail 6 is, and taking the other end to a higher height. The linear actuators 37 are, for example, hydraulic cylinders actuated by a hydraulic system driven by the smart control system. As alternative to hydraulic cylinders, it is possible to use electromechanical linear modules. The rotation-translation movement occurs when starting and stopping the wind system 1 in order to respectively facilitate the takeoff and recovery operations of kites 2.

Figure 20:
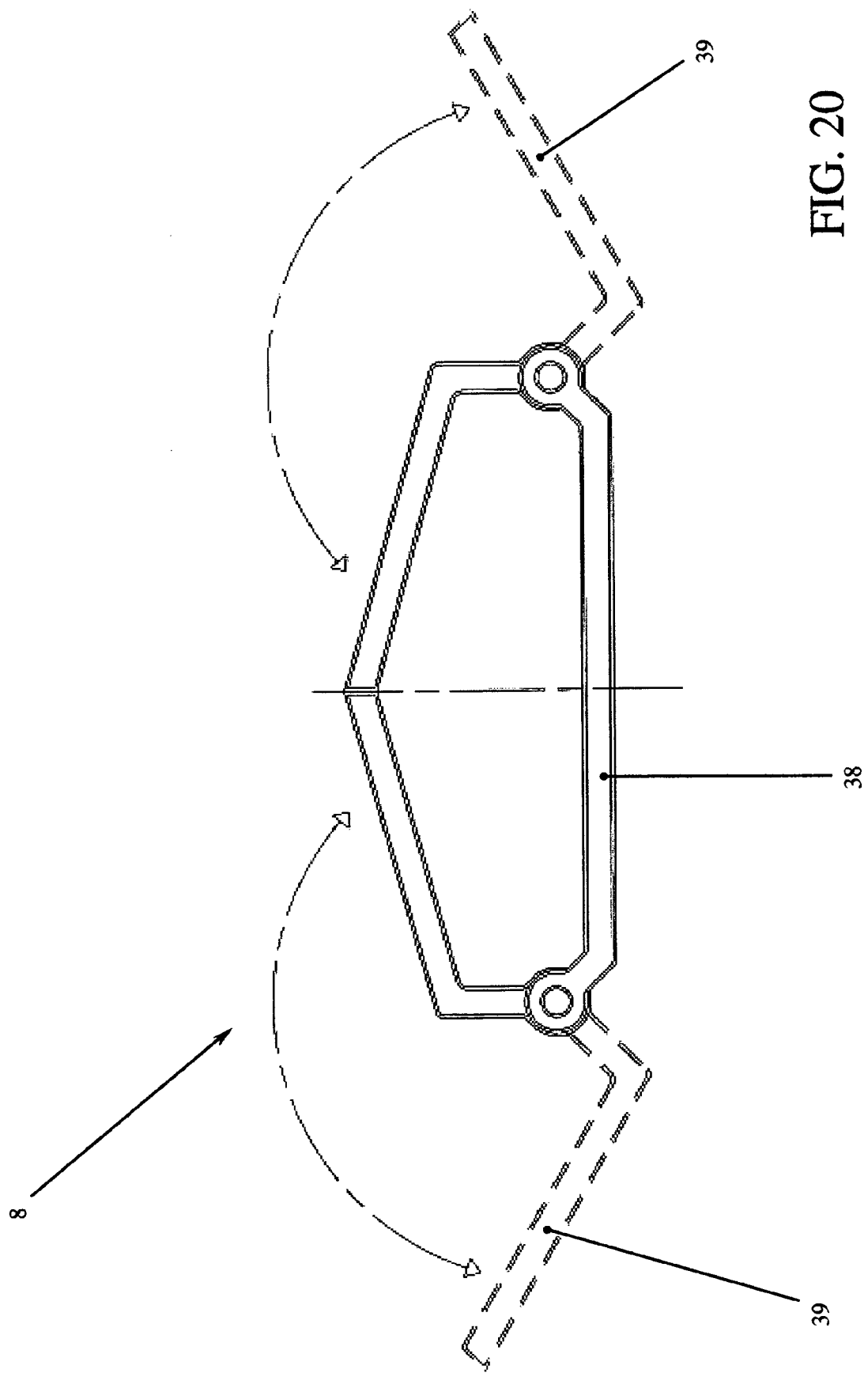
FIG. 20 shows a schematic, front sectional view of a preferred embodiment of a component of the wind system of FIG. 18 in two of its operating steps.

The housing movement consists in opening the recovering system 8 so that such system 8 becomes a platform suitable to house at least one train 3 of kites 2. As already previously stated, the recovering systems 8 on the ground can be, for example, containers with hinged cover and therefore has a different structure with respect to the solution with recovering systems 8 on board the modules 5 of the wind system 1. Firstly, since the recovering system 8 has to be opened like a platform, the best shape to be conferred to such recovering systems 8 is not any more the one of a cylindrical pipe. Moreover, the ground recovering systems have not the end part 10 able to be oriented any more and inside them there is not the trolley of the recovery and expulsion system. Each recovering system 8 is longitudinally sectioned in order to be composed, for example, of three parts 38 and 39. As shown in particular in FIG. 20, two parts 39 compose the cover of the recovering system 8 able to be opened, the third part 38 is the box of the container of the recovering system 8. The box 38 of the recovering system 8 is arranged with upwards oriented concavity and the other two parts 39 are hinged thereto 38 in order to create a structure that is able to be opened and closed, making the recovering system 8 assume the appearance of a platform. Opening of the containers 8 as a platform occurs upon starting and stopping the wind system 1, namely respectively in order to takeoff and recover the kites 2. After having ended takeoff or recovery operations, the recovering systems 8 are closed again.

Like the rotation-translation movement, also the housing movement occurs, for example, through linear actuators (not shown in the Figures). Such actuators can be hydraulic cylinders actuated by a hydraulic system (or linear electromechanical modules) driven by the smart control system.

With reference again to the wind system 1 version in which the recovering systems 8 are placed on the ground, two solutions can be adopted. The first solution consists in providing the wind system 1 with two recovering systems 8 for each module 5 (and therefore for each train 3 of kites 2); the second solution consists in using a lower number of recovering systems 8 than the number of modules 5 of the wind system 1.

If the wind system 1 is equipped with two recovering systems 8 for each module 5, every train 3 of kites 2 has two containers available in which it can be recovered: one placed inside the closed path described by rail 6, the other placed outside such path. By adopting this solution, a train 3 of kites 3 can be recovered in a recovering system 8 or in the other according to what wind W allows.

If instead the wind system 1 is equipped with a number of recovering systems 8 lower than the number of modules 5, the recovering systems 8 can be placed indifferently inside or outside the closed path described by the rail 6 and each recovering system 8 is aimed to house more that one train 3 of kites 2. For this reason, in such case, the ropes 4 for driving the kites 2 are equipped with an automatic coupling and uncoupling system (not shown in the Figures) through which the ropes 4 can be reversibly coupled and uncoupled with/from the trains 3 of kites 2. Due to such automatic system, a train 3 of kites 2 is recovered only when it is next to a recovering system 8 and wind conditions are favourable. When the recovery ends, the ropes 4 that connect a module 5 to the corresponding train 3 of kites 2 are uncoupled from the train 3 of kites 2 in order to allow advancing the modules 5 and recovering the train 3 of kites 2 of the following module 5. Similarly, through the same automatic coupling and uncoupling system, the ropes 4 are coupled again to the train 3 of kites 2 upon starting the wind system 1, upon the kites 2 takeoff. Obviously, the automatic system for coupling and uncoupling the ropes 4 is superfluous if the wind system 1 is equipped with two recovering systems 8 for every module 5 since, in such case, every trolley 11 of the wind system 1 remains constrained to the corresponding train 3 of kites 2 even with a wind system 1 at rest. To allow a recovering system 8 to house many trains 3 of kites 2, it is further necessary to provide each recovering system 8 with an automatic storing system (not shown in the Figures) through which it is possible to recover or takeoff in succession many trains 3 of kites 2 and orderly arrange the trains 3 of kites 2 inside the recovering system 8. Such automatic storing system is composed, for example, of translating shelves handled by belts and is driven by the smart control system. The shelves translate remaining parallel and describing a closed path in order to allow a quick succession of landing, storage and takeoff operations of the trains 3 of kites 2.

Similarly to the solution characterised by placing the recovering systems 8 on board the modules 5 of the wind system 1, making the takeoff and recovery of kites 2 easier can be obtained with jets of compressed air suitably blown to expel and handle the kites 2 without needing contacts. The devices for obtaining this artificial wind thrust are arranged on the length of the recovering systems 8 and the manoeuvres are controlled by the smart control system in order to realise an accurate and agile handling device. The same artificial wind thrust devices can help recovering the train 3 of kites 2. Through these devices, it is in fact possible to create artificial air flows with which the drivability of kites 2 is guaranteed when kites 2 are next to the recovering systems 8.

In case of ground recovering systems 8, it is possible to place a disappearing guiding system (not shown in the Figures) next to the end of the recovering system 8 through which the train 3 of kites 2 passes to be able to be rested onto the platform. Such disappearing guiding system must facilitate the landing of the train 3 of kites 2 onto the recovering system 8 and is composed, for example, of a pair of rods placed on the sides of the recovering system 8 and in front of it. The rods are lifted almost in a vertical position in the instants preceding the landing step in order to contain the possible flagging of the train 3 of kites 2 and address it towards the recovering system 8 opened as a platform. Also such disappearing guiding system is driven by the smart control system.

Summarising, by placing the recovering systems 8 of the kites 2 on the ground, assuming that the wind system 1 is equipped with two recovering systems 8 for each train 3 of kites 2, the kites 2 recovery operation occurs in the following way:

the ropes 4 connecting the train 3 of kites 2 to the trolleys 11 of the wind system 1 are rewound in order to take the trains 3 of kites 2 next to the trolley 11;

the disappearing guiding systems are actuated and, through the rotation-translation and housing movements, the recovering systems 8 are lifted, upwards slanted and opened as a platform;

the stroke of the modules 5 of the wind system 1 is stopped and, through the help of artificial wind thrust devices, the trains 3 of kites 2 are simultaneously rested onto the corresponding platforms, inside or outside the closed path described by rail 6; and the recovering systems 8 are closed again and made rotate-translate in order to be arranged next to the ground.

If each recovering system 8 is aimed to house many trains 3 of kites 2, the recovery operation does not occur simultaneously for all trains 3 of kites 2. The wind system stroke is stopped in order to allow landing a number of trains 3 of kites 2 equal to the number of recovering systems 8. Now, through the automatic coupling and uncoupling system, the ropes 4 are uncoupled from the landed trains 3 of kites 2 and the automatic storing systems recover the trains 3 of kites 2 making available free flatbeds for landing the other kites 2. The wind system 1 starts again and the modules 5 uncoupled from the trains 3 of kites 2 go on travelling on the rail 6 in order to allow recovering the trains 3 of kites 2 of following modules 5. After all trains 3 of kites 2 have been recovered in corresponding containers, the recovering systems 8 are closed again and lowered in order to be arranged next to the ground.

The kites takeoff occurs through the same sequence of operations, but performed in a reverse order. With reference again to the case in which each recovering system 8 is aimed to house a single train 3 of kites 2, the recovering systems 8 are lifted, upwards slanted and opened as a platform. The artificial wind thrust devices are then actuated in order to expel the trains 3 of kites 2, and the modules 5 of the wind system 1 advance on the rail 6 due to the motors 20 controlled by the smart control system, generating at the level of the trains 3 of kites 2 a slight breeze that allows the kites 2 to ascend.

If instead each recovering system 8 is aimed to house many trains 3 of kites 2, similarly to the landing step, also the takeoff step occurs simultaneously for all trains 3 of kites 2. In this case, after the recovering systems 8 are lifted, upwards slanted and opened as a platform, through the automatic coupling and uncoupling system, the ropes 4 are coupled with the trains 3 of kites 2 that must takeoff. After the kites 2 takeoff, the modules 5 coupled with the trains 3 of kites 2 advance on the rail 6 in order to allow coupling the trains 3 of kites 2 by the following modules 5. After all the trains 3 of kites 2 have made their takeoff, the recovering systems 8 are closed again and lowered in order to be arranged next to the ground.

The wind system 1 according to the present invention further comprises at least one transmission system.

The transmission systems are the components of the modules 5 of the wind system 1 that drive the ropes 4 between kites 2 and systems 22 for winding and unwinding the ropes 4. The transmission systems are composed of pulleys assembled on the modules 5 of the wind system 1.

Each module 5 of the wind system 1 is equipped with a transmission system in which there are preferably two rows of pulleys, one for each of the two ropes 4 with which the kites 2 are driven. In case of use of a single rope 4 as interconnection member between module 5 of wind system 1 and kites 2, each module 5 is equipped with a single row of pulleys.

The pulleys present in each transmission system can be divided into four categories:

the pulleys 35 assembled on the trolley of the recovery and expulsion system of the kites 2;

the fixed pulleys 33 directly constrained to the module 5 of the wind system 1;

the pulleys being part of the systems for absorbing the force peaks of the ropes 4 mentioned below;

the pulleys being part of the system for frictioning the ropes 4 mentioned below;

the pulleys 34 assembled on sliders of the driving modules 26 of the ropes 4 (one for each slider 27).

In case of use of two trolleys 11 for each module 5 of the wind system 1, excluding the pulleys with which the recovery and expulsion system of the kites 2 is equipped, the other pulleys 33 are placed on the trolley 11 of the module 5 that is at a lower height. The global number of pulleys composing a transmission system depends, obviously, on the trolley 11 sizes.

The wind system 1 according to the present invention further comprises at least one system for absorbing the force peaks of the ropes 4 (not shown).

The systems for absorbing the force peaks of the ropes 4 are the components of the wind system 1 that compensate the sudden load variations of a small entity that the ropes 4 do not succeed in absorbing. The systems for absorbing the force peaks are placed between the systems 22 for winding and unwinding the ropes 4 and the recovering system 8.

The wind system 1 according to the present invention can be equipped, for example, with the system for absorbing the force peaks disclosed in previously-mentioned Italian patent application n. TO2006A000491, to which reference can be made for a more detailed explanation.

Synthetically, each system for absorbing the force peaks is composed of a pulley connected to a dampened counterweight lifted from the ground and able to vertically translate, constrained by a suitable guide. On the pulley a rope 4 is wound, with which a train 3 of kites 2 is driven so that it is the rope 4 tension that keeps the counterweight lifted. Each module 5 of the wind system 1 of the present invention should be equipped with at least one system for absorbing the force peaks for each traction rope 4 with which the kites 2 driving occurs.

The wind system 1 according to the present invention further comprises at least one system for fractioning the ropes 4 (not shown).

The systems for frictioning the ropes 4 are the components of the wind system 1 that block the ropes 4 when there is no load and contribute to compensate the sudden load variations of a small entity that the ropes 4 are not able to absorb. The systems for frictioning are placed between the systems 22 for winding and unwinding the ropes 4 and the recovering system 8.

The systems for fractioning, of which the wind system 1 according to the present invention is composed, comprise, for example, a pulley constrained to a linear guide. In parallel to the translation direction imposed by the linear guide, a dampened spring is placed, that is constrained next to an end to the pulley and next to another end to the trolley 11. On the pulley a rope 4 is wound, with which a train 3 of kites 2 is driven so that, due to the rope 4 tension, the spring is compressed. When a sudden load increase occurs on the rope 4, such load increase is partially attenuated by the spring compression. The main function performed by such system for frictioning however consists in blocking the rope 4 when there is no load. The spring can in fact be preloaded so that, when there is no load on the rope 4, the rope 4 itself is compressed by the spring between the frictioning system pulled and a second pulley.

Each module 5 of the wind system 1 of the present invention must be equipped with at least one frictioning system for each traction rope 4 with which the kites 2 driving occurs.

The wind system 1 according to the present invention further comprises at least one winding and unwinding system 22 of the ropes 4 (not shown).

The systems 22 for winding and unwinding the ropes 4 are the components of the module 5 of the wind system 1 placed between the systems for frictioning (or the systems for absorbing the force peaks) and the storing systems 23 of the ropes 4 mentioned below.

The wind system 1 according to the present invention can be equipped, for example, with the same systems 22 for winding and unwinding the ropes 4 disclosed in previously-mentioned Italian patent application n. TO2006A000491, and to which reference must be made for a more detailed explanation.

Synthetically, every module 5 of the wind system 1 is equipped with a winding and unwinding system 22 comprising two pairs of four winches 24 around which the pair of ropes 4 of the corresponding train 3 of kites 2 are wound. Each rope 4 exiting the frictioning system is wound around the four corresponding winches 24 of the winding and unwinding system 22, after which it proceeds towards the storing system 23. The systems for winding and unwinding 22 are those that support the whole ropes 4 pull.

The four winches 24 around which each rope is wound are arranged on two levels (two at a higher level and two at a lower level) and have parallel rotation axes. Every rope 4 on average is wound on each of these winches 24 for about three quarters of a circumference. Since there are four winches 24 for every rope 4, the global winding of a rope 4 on the winches 24 of the present system is equivalent to three complete windings of the rope 4 on a single winch. The four winches 24 on which the same rope 4 is wound are connected, for example through gears, to a motor 28 (by possibly interposing a reducer) whose actuation is regulated by the smart control system. It is by means of these winches 24 that the kites 2 driving occurs. An alternative solution (not shown in the Figures) consists in using a motor for each winch 24. To simplify, herein below reference will be made to the case in which the systems for winding and unwinding 22 of the ropes 4 are equipped with a single motor 28 for every four winches 24 on which a single rope 4 is wound.

Friction between each winch 24 and rope 4 can be increased by suitably shaping the surface of the winches 24 in order to house the rope 4 increasing the contact surface between rope 4 and winch 24.

Always focusing the attention on a single rope 4, it is possible to differentiate the roughness of the surface of the four winches 24 in order to progressively increase the friction between rope 4 and winch 24 proceeding towards the storing systems 23.

In case of use of a single rope 4 as interconnection member between module 5 of wind system 1 and kites 2, the winding and unwinding system 22 of the ropes 4 is equipped with four winches 24 only. This reduces the encumbrance of the winding and unwinding system 22 of the ropes 4 and the inertia of the module 5 of the wind system 1, with a lower energy consumption upon starting the system.

It must be remembered that the distinction between driving system 22 and storing system 23 for the ropes 4 is made necessary by the great length of the sections of rope 4 connected to the kites 2. Should in fact be a single winch for each rope 4 (thereby operating both as driving system and as storing system), the rope 4 would be completely wound around the winch drum, forming many layers and at the same time supporting great loads. Such situation must be avoided since frictions that would be created due to sliding between the different rope 4 windings, would wear the rope 4 at such extent as to impair its mechanical properties.

As alternative to systems for winding and unwinding 22 of the ropes 4 of the "four winches" type, it is possible to use, for example, a single winch for each rope 4. In such case, the rope 4 is wound around such winch by performing only a limited number of revolutions (a number such that there is a single layer of windings) after which it proceeds towards the storing system 23. A second alternative consists in using devices equipped with a pair of faced tracks within which the rope 4 is inserted. Both alternative solutions to the above-described winding and unwinding system 22 of the ropes 4 are anyway disclosed in Italian patent application n. TO2006A000491.

The wind system 1 according to the present invention further comprises at least one storing system 23 of the ropes 4 (not shown).

The storing systems 23 of the ropes 4 are the components of the module 5 of the wind system 1 that take care of storing the ropes 4 of the kites 2.

The wind system 1 according to the present invention is equipped, for example, with the same storing systems 23 of the ropes 4 disclosed in previously-mentioned Italian patent application n. TO2006A000491, to which reference can be made for a more detailed explanation.

Synthetically, every module 5 of the wind system 1 is equipped with a storing system 23 of the ropes 4 comprising a pair of winches 25 around which the pair of ropes 4 of the corresponding train 3 of kites 2 are wound. These winches 25 are connected, through a pair of reducers, to a pair of motors 29 whose actuation is regulated by the smart control system. Similarly to what has been previously stated, in case of use of a single rope 4 as interconnection member between a module 5 of the wind system 1 and the corresponding train 3 of kites 2, the storing system 23 of the ropes 4 is equipped with a single winch 25 connected, through a reducer, to a single motor 29. This reduces the encumbrance of the storing system 23 of the ropes 4 and the inertia of the module 5 of the wind system 1, with a lower energy consumption upon starting the system.

The storing systems 23 do not also take care of driving the kites 2. In such a way, the tension of the ropes 4 wound around the winches 25 of the storing systems 23 is much lower than the tension that can be detected in the sections of rope 4 wound on the winches 24 of the winding and unwinding systems 22. Therefore, where the ropes 4 load is greater, the number of windings on the winches 24 is such that the ropes 4 are never arranged on two or more layers. Vice versa, on the winches 25 of the storing systems 23, the ropes 4 are wound on many layers but the tension is minimum. The diameter of the winches 25 composing the storing systems 23 is greater than the diameter of the winches 24 of the winding and unwinding systems 22, in order to minimise anyway the amount of winding layers. The smart control system therefore has also the purpose of synchronising the rotation of the winches 24 and 25 of the winding and unwinding system 22 of the ropes 4 and of the storing system 23 around which the same rope 4 is wound. This is fundamental for managing the load on the section of rope 4 included between the two systems 22 and 23, above all during the steps of starting and stopping the wind system 1.

Since on the winches 25 of the storing systems 23 of the ropes 4 the windings are on many layers, next to each winch 25 it is necessary to place a driving module 26 that forces the rope 4 to an orderly winding on the winch 25 and prevents sliding between rope 4 and flanks of the winch 25 and between the windings themselves. The driving modules 26 of the ropes 4 are the components of the modules 5 of the wind system 1 that force the ropes 4 to an orderly winding on winches 25 of the storing systems 23 and that prevent sliding between ropes 4 and flanks of the winches 25 and between ropes 4 themselves.

The wind system 1 according to the present invention is equipped, for example, with the same driving modules 26 of the ropes 4 disclosed in previously-mentioned Italian patent application n. TO2006A000491, to which reference can be made for a more detailed explanation.

Synthetically, these driving modules 26 are composed of a slider 27 constrained to a rail arranged in parallel with the rotation axis of the winch 25 of the corresponding storing system 23 of the ropes 4. The slider 27 is able to translate in the two directions and a pulley 34 is assembled thereon. In particular, such trolley 27 moves at every pitch of winch 25.

In the driving modules 26 of the ropes 4, the translation of the slider 27 occurs by means of an electric motor 30 whose operation is regulated by the smart control system that drives the kites 2.

In the wind system 1 there is a driving module 26 of the ropes 4 for every winch 25 of the storing systems 23.

As an alternative to the use of the driving modules 26 of the ropes 4 it is possible, for example, to place each winch 25 of the storing systems 23 of the ropes 4 on a trolley that translates on a guide placed in parallel with the rotation axis of the corresponding winch 25. Sliding of the trolley occurs by means of an electric motor whose operation is regulated by the smart control system. Also such solution is disclosed in Italian patent application n. TO2006A000491. By adopting this solution, the driving module 26 of the rope 4 is not necessary any more since it is the winch 25 itself that translates in order to guarantee an orderly winding of the rope 4.

The modules 5 of the wind system 1 are equipped with electric motors that also operate as generators and with generators 20 and/or 21 that also operate as motors.

The electric motors are those through which the actuations of winches 24 and 25 and of the driving modules 26 of the ropes 4 occur.

In particular, for each rope 4 the wind system 1 is equipped with three electric motors:

a motor 28 responsible for rotating the winches 24 of the winding and unwinding system 22 of the rope 4;

a motor 29 responsible for rotating the winch 25 of the storing system 23 of the rope 4;

a motor 30 responsible for translating the slider 27 of the driving module 26 of the rope 4 (or the trolley on which the winch 25 of the storing system 23 of the ropes 4 is assembled).

For moving the end part 10 of the recovering systems 8, every module 5 of the wind system 1 is further equipped with a hydraulic system that actuates the hydraulic cylinders 32 or with linear electromechanical modules.

Each of the motors 28, 29 and 30 could be interfaced with the corresponding winch 24 and 25 or driving module 26 of the ropes 4 through a reducer, for example of the epicycloid type.

Since these motors 28 and 29 can also operate as generators, it is possible to produce electricity through the motors 28 connected to winches 24 of the winding and unwinding system 22 of the ropes 4, by exploiting the traction exerted by the kites 2 on said winches 24. The electric motors are controlled by the smart control system and those corresponding with the same rope 4 of the kites 2 must operate in synchronism.

In order to produce electricity by exploiting the traction of the modules 5 of the wind system 1 by the kites 2, the solutions that can be adopted are multiple and also depend on the mode with which the modules 5 translate on the rails 6.

The production of electricity can occur by means of generators/motors 20 directly actuated by the rotation of the wheels 16 through which the modules 5 of the wind system 1 travel on the classic rail 6 (or actuated by the rotation of the wheels 16 of the trolleys 11 used for energy conversion).

As previously stated, the production of electricity can also occur by means of generators 21 actuated by the rotation of toothed wheels 18 that roll on at least one rack 15 placed on the classic rail 6 on which the modules 5 of the wind system 1 travel.

The energy production can finally occur by using reversible magnetic linear motors, so that they operate as generators.

In railway transports with magnetic levitation, the magnetic repulsion and attraction are used not only for levitating a convoy but also as means of locomotion. In particular, in order to move a convoy and for braking it, in the magnetic levitation transport a synchronous linear motor is used, that operates as electric rotary motor in which the stator has been opened and laid along the rail. Rotor and stator do not produce a torsion moment, but a linear force. Such force is produced by a series of magnets or solenoids that generate a sliding magnetic field, which interacts with electromagnets placed on the rail. The magnetic field coming from the convoy induces, in rail electromagnets, an electric current that operates by repelling the inducing field. This generates a force that pushes the convoy in an opposite direction to the magnetic field sliding direction.

The same principle can be employed for magnetically converting into electric energy the mechanical energy deriving from the dragging effect of the kites 2 on the modules 5 of the wind system 1. In particular, the modules 5 of the wind system 1 can be equipped with permanent magnets (that therefore do not need to be supplied) possibly helped by superconductor-type solenoids (that require relatively few energy) and it is possible to place on the rail 6 metallic windings that operate as electromagnets. Such windings are suitably arranged so that the permanent magnets, when the modules 5 translate on the rail 6, induce currents in these electromagnets. Such induced currents partly generate a magnetic field that is opposed to the inducing one, determining the levitation of the modules 5, and partly are the fruit of the conversion of mechanical energy into electric energy. In particular, the modular composition of the permanent magnets and the respective magnetic circuit faced on the rail 6 and on the modules 5 takes to a continuous variation of induced flow during the relative translation of the modules 5 with respect to the rail 6. These flow variations in magnetic circuits are profitably coupled with windings for collecting electric energy. These windings can be interlocked to a power electronics that change their absorption in a controllable and quick way. In this way, the system becomes an actuator that can intervene by modulating the forces in transients dynamics. This characteristic allows realising a virtual dampener that can absorb possible fluctuating or oscillating energy excesses of the sliders equipped with permanent magnets, in the normal direction to the plane of the air gap.

The permanent magnets with which the modules 5 must be equipped can be, for example, neodymium iron boron magnets. Such magnets are the best candidate for obtaining a wide enough air gap and intense magnetic flows. The maximum capacity of the sliders equipped with permanent magnets is function of the faced area and takes advantage from the magnetic repulsion that changes with the square of the distance.

Summarising, the use of magnetic levitation through permanent magnets allows joining three functionalities in a single subsystem: the suspension of the modules 5 with a low friction (sliding of the modules 5 is therefore extremely efficient and can occur without wearing members), electric generation (that occurs directly in rail 6) and energy absorption of possible oscillations and fluctuations of the sliders equipped with permanent magnets under the thrust of the modules 5 (and therefore of the stretched flexible structure 12).

In order to prevent risks of drafting of the sliders equipped with permanent magnets, the type of support connection has two degrees of freedom as a ball-type articulation and pushes in a barycenter area of the slider. In this way, only stresses along the sliding direction are transmitted, those transverse and those planar or normal to the air gap plane.

As regards the energy conversion, there are four configurations that it is possible to adopt for the wind system 1 of the present invention:

the modules 5 of the wind system 1 travel on classic main rails 6 by means of wheels 16 and 17 whose rotation directly actuates generators 20 for producing current. The wheels 16 connected to the generators 20 are those on which the module 5 weight rests. Such configuration can be adopted only if the rolling friction of such wheels 16 is enough to actuate the generators 20;

the modules 5 of the wind system 1 travel on classic main rails 6 by means of wheels 16 and 17 but the production of current occurs mainly by actuating generators 21 connected to toothed wheels 18 rolling on at least one rack 15. Even if in such configuration the smooth wheels 16 mostly perform a support function, they are anyway connected to motors 11 that, as explained below, are actuated upon starting the wind system 1 for starting-up the modules 5. Such motors 11 can be used as generators when the wind system 1 operates, exploiting the rolling friction between smooth wheels 16 and classic rail 6;

the modules 5 of the wind system 1 travel on rails 6 that are a combination between a classic rail and a magnetic rail, by means of wheels 16 and 17 that exclusively perform the support function. The production of current occurs by using reversible magnetic linear motors, so that they operate as generators;

the modules 5 of the wind system 1 travel on rails 6 that are a combination between a classic rail and a magnetic rail, by means of magnetic levitation. The modules 5 are also equipped with wheels 16 that ensure keeping the air gap. The production of current occurs by using reversible magnetic linear motors, so that they operate as generators.

Of the four above-described configurations, those that provide for the use of reversible magnetic linear motors are those that ensure the delivery of electric powers of a higher order of magnitude.

The devices that take care of generating electricity, being rotary generators/motors 20 or reversible linear motors, are used as motors upon starting the wind system 1, in order to advance the modules 5 and generate a light breeze at the end of the recovering systems 8 in order to favour the kites 2 ascension. If the modules 5 of the wind system 1 are not mutually connected through a stretched flexible structure 12, another circumstance in which the generators 20 are used as motors is when, during the wind system 1 operation, the dragging effect of the kites 2 is missing. In such case, the module 5 of the wind system 1 initially goes on advancing by inertia. If the smart control system does not manage to restore the dragging effect shortly, the generators 20 are actuated in order to operate as motors and the module 5 goes on advancing without compelling the following module 5 to slow-down its own travel.

The smart control system is the system through which the kites 2 are automatically driven. The main task of this component consists in driving the operation of the motors 28 and 29 connected to the winches 24 and 25 of the winding and unwinding systems 22 and of the storing systems 23 of the ropes 4, and in controlling the system adapted to drive the end part 10, adapted to be oriented, of the recovering systems 8 of the kites 2. Obviously, each train 3 of kites 2 is driven independently from the other ones, avoiding that flight interferences can occur.

The smart control system of the wind system 1 according to the present invention can preferably be like the one disclosed in previously-mentioned Italian patent application n. TO2006A000491, to which reference must be made for a more detailed explanation.

Synthetically, the main functions performed by the smart control system are the following:

automatic control of the flight of kites 2;

self-calibration of the sensors as equipment of kites 2;

prevention of collisions between kites 2 and other flying objects;

actuation of the driving modules 26 of the ropes 4o of the motors for translating the winches 25 of the storing system 23;

actuation of the motors;

compensation of the load variations of the ropes 4.

The supply system comprises all necessary components for accumulating and delivering electric energy. In particular, the wind system 1 is equipped with power supplies, transformers and accumulators through which the produced electricity is stored, current is delivered to motors during the starting phase of the modules 5 of the wind system 1 and for recovering the kites 2, supplying all electronic components and providing electric power to external users. Even if the operation of all electronic components of the wind system 1 is controlled by the smart control system.

The present invention further refers to a process for producing electric energy through a wind system 1 as previously described.

In general, the process of the present invention, that integrates the energy conversion process from wind energy to electric energy enacted through the wind system 1 of the present invention, comprises four steps that are cyclically repeated when the wind system operates.

With reference to a single module 5 of the wind system 1 and hypothetically assuming that the direction along which wind W blows is constant and that the rails 6 and 7 describe a circular path, during the first three steps of the process according to the present invention, the translation of the module 5 is due to the wind energy subtracted from the wind W by means of the train 3 of kites 2 connected to such module 5. The smart control system therefore drives the train 3 of kites 2 so that the wind energy that it is possible to subtract to wind is maximum, compatibly with the need of keeping the ropes 4 as much as possible tangential to the rail 6 during the whole step. In fact, the more tangential the ropes 4 are to the rail 6, the greater is the useful component of the traction force as regards handling the module 5. The fact that the ropes 4 are kept tangential to the rail 6 implies that the control system drives the train 3 of kites 2 in order to mainly exploit the lift force, namely the force component perpendicular to the wind speed. In this way, the kites 2 advance going on sweeping the wind front surface. The wind then advances the kites 2, tensioning the ropes 4 connected to the modules 5 of the wind system 1: this dragging effect determines the handling of the modules 5 and the production of electric energy by means of generators 20 and/or 21 or of the reversible magnetic linear motors.

The fourth and last step of the process according to the present invention instead occurs in the downwind area. The smart control system drives the train 3 of kites 2 in order to quickly cross such area without producing any braking effect on the module 5 of the wind system 1. In particular, not only the smart control system drives the train 3 of kites 2 in order to follow the translation of the module 5, but a dragging effect from the kites 2 is still present (even if scarcely efficient). If the modules 5 of the wind system 1 are mutually connected through a system of tie-rods 14, the modules 5 for which the dragging effect is still present provide a contribution to the advancement of the module 5 that is in this step of the operating cycle. If instead the modules 5 are not mutually connected through a system of tie-rods 14, during such step the advancement of the examined module 5 occurs above all by inertia.

Figure 21:
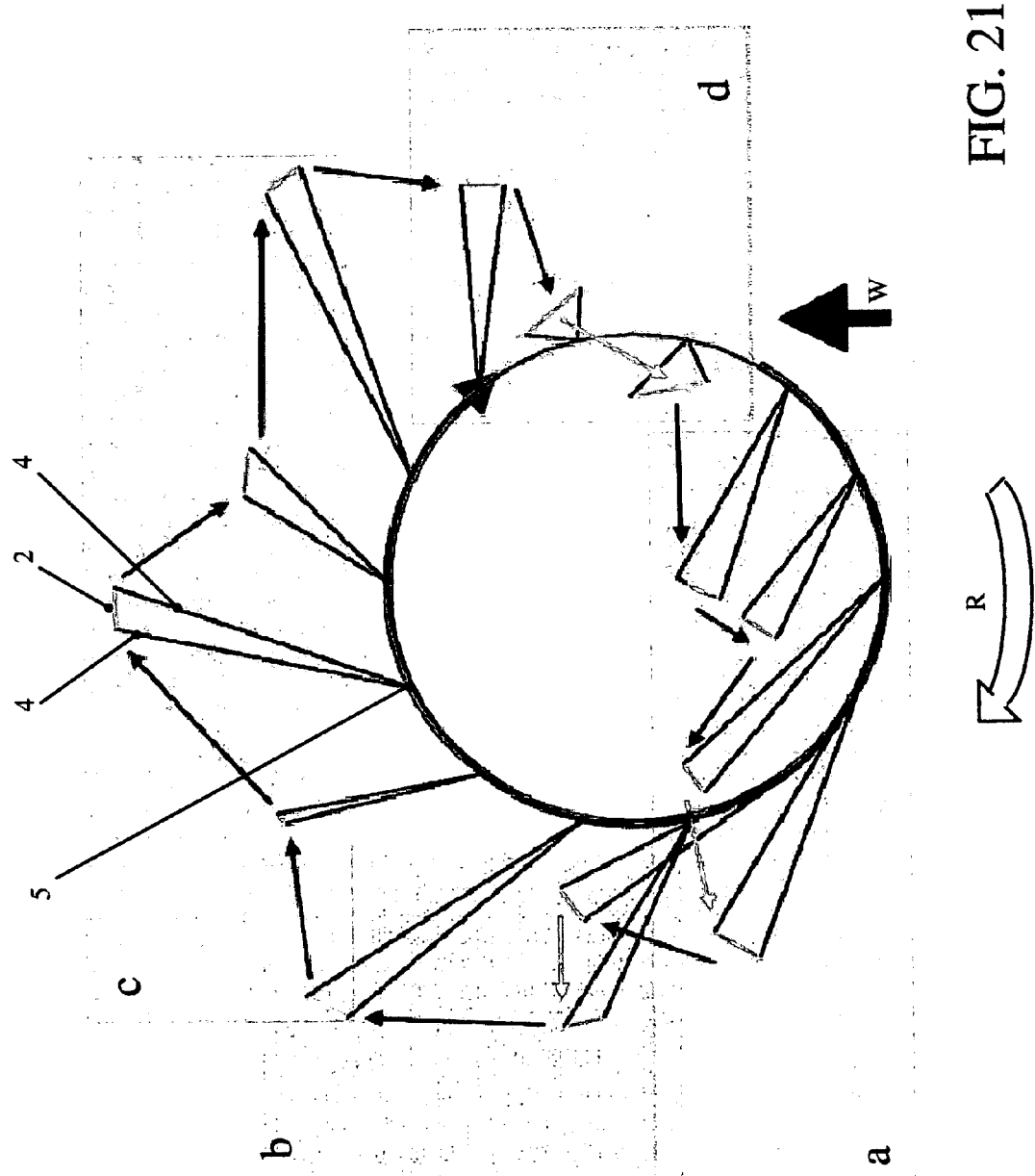
FIG. 21 shows a schematic view of the system according to the present invention in some of its operating steps.

With particular reference to FIG. 21 that shows a potential path described by a kite 2 during a cycle of the process according to the present invention and supposing that the speed direction W of the wind and the translation direction designated by arrow R of the modules 5 are kept constant, focusing the attention on a single module 5 of the wind system 1, the four steps composing the process according to the present invention, respectively designated by dashed squares a, b, c and d delimiting the various space areas in which the kite 2 is, depending on the wind current direction W in which it is immersed, are as follows:

a) during such step the kite 2 proceeds transversally with respect to the wind direction W (square a in FIG. 21). The wind then blows transverse with respect to the advancement direction of the kite 1. The length of the unwound sections of rope 4 increases since the kites 2 move away from the module 5 of the wind system 1. Afterwards, such step proceeds similarly to what is disclosed in previously-mentioned Italian patent application n. TO2006A000491, to which reference can be made for more explanations;

b) during such step, the kite 2 proceeds along the same direction W in which the wind blows (square b in FIG. 21). In such step, the exploitation of the lift of the kite 1 is summed to the resistance one. This makes the kite 2 speed greater than the wind speed W and, in order to exploit the dragging effect, it is necessary to partly rewind the ropes 4. In spite of such recovery, even during this step, the energy balance is positive. Afterwards, also for this step the statements are valid that have been described in previously-mentioned Italian patent application n. TO2006A000491, to which reference can be made for more explanations;

c) similarly to what occurs during the above-cited first step a) of transverse wind, in this step the kite 2 is taken to transversally proceed with respect to the wind direction W (square c in FIG. 21) and the length of the unwound sections of rope 4 increases since the kites 2 move away from the module 5 of the wind system 1. Afterwards, also for this step the statements are valid that have been described in previously-mentioned Italian patent application n. TO2006A000491, to which reference can be made for more explanations;

d) during this step, the kite 1 proceeds along an opposite direction with respect to the wind one (square d in FIG. 21). The smart control system drives the kite 2 in order not to generate any braking effect since, it performs a sudden manoeuvre defined as "azimuth jibe" that consists in a quick transition between two transverses, during which the kite 2 travels in air for a distance equal to at least three times the affected arc of circumference in the time in which the module 5 of the wind system 1 travels along such arc. The kite 2 loses height without opposing in any way the translation of the module 5. During such step, it is necessary to recover, in relatively short times, a long section of unwound rope 4. At the end of the azimuth jibe, the kite 2 is placed in order to be captured by the wind W and proceeds transversally with respect to this latter one. Also for this step the statements are valid that have been described in previously-mentioned Italian patent application n. TO2006A000491, to which reference can be made for more explanations; and e) cyclically repeat the previous steps for every complete rotation of the module 5 along the rail 6.

As can however be noted, contrary to what is disclosed in Italian patent application n. TO2006A000491 related to the wind system with arms and rotating shaft, in which there are systems for accumulating energy with which the length of the unwound sections of rope 4 is increased or reduced without rotating the winches 24 and 25 of the winding and unwinding system 22 and of the storing systems 23 of the ropes 4, in the wind system 1 according to the present invention the regulation of the unwound sections of rope 4 occurs by means of said winches 24 and 25. During the whole operating cycle, the kites 2 are driven in order to alternatively gain and lose height. This choice is firstly dictated by a technical need since the modules 5 of the wind system 1 more slowly translate with respect to the kites 2. Secondly, the continuous alternative situation between height gain and loss is also extremely advantageous as regards optimising the energy that can be subtracted from the wind. In fact, by sweeping the wind front surface, the power that the kites 2 are able to develop is greater.

Moreover, with respect to the wind system with arms and rotating shaft of Italian patent application n. TO2006A000491, the wind system 1 according to the present invention is improved in the following aspects:

while the wind system with arms and rotating shaft is characterised by a central guide and the production of electric energy occurs by exploiting the twisting moment generated on the arms of a turbine by kites, the wind system of the present invention is characterised by a ring-type guide, with at least one module that translates on at least one rail, and energy conversion occurs by exploiting dragging of the modules by the kites;

while in the wind system with arms and rotating shaft driving of the kites occurs exclusively by means of ropes, in the wind system of the present invention driving of the kites can be performed also through spoilers or spoilers placed on board the same kites. In particular, driving occurs by creating, by means of spoilers, turbulences that give rise to pressure gradients. Such driving mode integrates or replaces the one provided by the wind system with arms and rotating shaft;

while in the wind system with arms and rotating shaft the components arranged for storing the ropes and driving the kite are in the turbine centre (and therefore far away from the point in which the ropes move away from the ground towards the kites), in the wind system of the present invention the storing systems for the ropes are on board of each module, next to the recovering systems of the kites. The absence of arms confers to the wind system of the present invention a structure due to which it is possible to generate powers with much higher orders of magnitude (for example, 1 GW) with respect to power that can be obtained by the wind system with aims and rotating shaft. In fact, the removal of arms reduces the wind system inertia and allows increasing the length of the path described by the modules and consequently, with the same distance between a module and the following one, the number of modules with which the wind system is equipped; while in the wind system with arms and rotating shaft the pipes for recovering the kites are fixed, in the wind system of the present invention the kite recovering systems have the end part able to be oriented, with the chance of rotating both in the horizontal plane and in the vertical plane. This facilitates the kites recovering and launching operations.

As further proof of the high efficiency demonstrated by the wind system and the process according to the present invention, it is possible to provide some considerations regarding the power that a single kite 1 is able to subtract to the wind.

Figure 22:
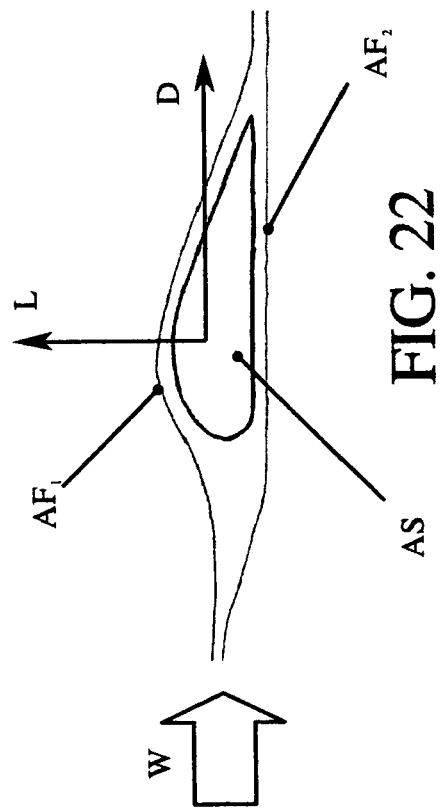
FIG. 22 shows a schematic view of a stationary aerodynamic surface immersed in a wind current and the related forces generated thereby.

For such purpose, with particular reference to FIG. 22, it is advisable firstly to underline the system aerodynamics. It is known that, when a wind current meets a stationary aerodynamic surface AS (in English "airfoil"), such current generates two forces: the drag force D parallel to direction W in which wind blows and the lift force L perpendicular to such direction W. In case of wind laminar flow, the wind currents $AF_1$ passing above the aerodynamic surface AS are quicker than the forces $AF_2$ passing below it since they must travel for a longer distance. This generates a pressure decrease in the upper part of the kite and therefore a pressure gradient that gives rise to the lift force L.

Figure 23:
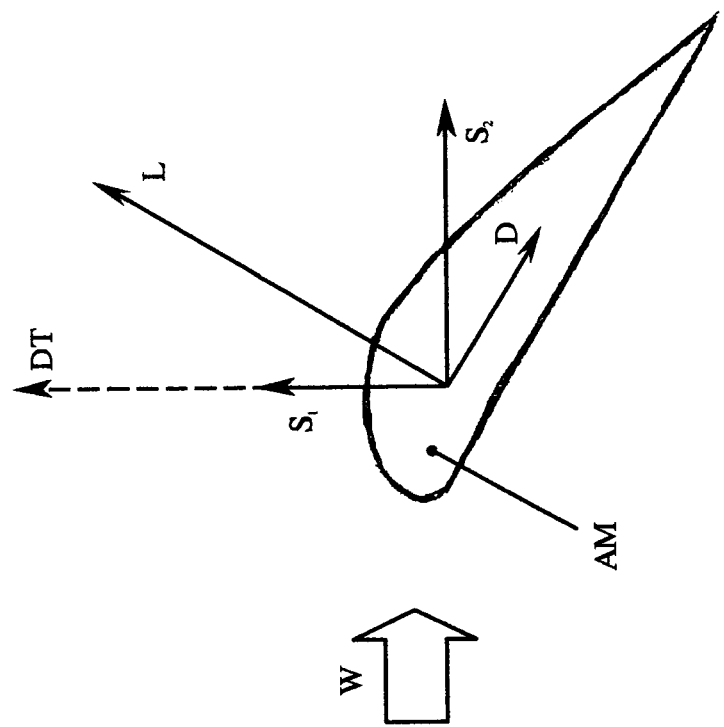
FIG. 23 shows a schematic view of an aerodynamic surface free of moving along the direction perpendicular to wind speed and the related forces generated thereby.

Instead, with reference to FIG. 23, suppose that the kite AM can move along the lift force direction DT. Due to the effect of such motion, the lower surface of the airfoil section AM is slanted with respect to the wind speed. In such case, lift force and drag force are respectively perpendicular and parallel to the relative wind speed with respect to the kite.

Designating with $S_1$ the force parallel to motion direction and with $S_2$ the force perpendicular to such direction, the component of the lift force L parallel to the motion direction has the same sense of the translation of the airfoil section AM while the parallel component of the drag force D has an opposite sense.

For this reason, as regards keeping the motion in a perpendicular direction to wind currents, it is advisable to slant the kite AM in order to obtain a high ratio between the lift force component L along the motion direction DT of the kite AM with respect to the drag force component D.

These considerations are also valid for every single kite 2 of the wind system 1.

The smart control system in fact drives each kite 2 in order to keep the ratio between lift force and drag force high during the steps characterised by a high dragging effect by the wing kites 2. In such a way, the kites 2 oscillate sweeping the wind front and generating power due to the ropes 4 pull.

The power generated by a single kite 2 is computed by multiplying the specific wind power designated as Specific Wind Power by the front wind area intercepted by the kite (namely the kite area) A and by the Kite Power Factor KPF, a performance coefficient that depends on ratio $V_k/V_w$ between kite speed $V_k$ and wind speed $V_w$ and on two coefficients $K_d$ and $K_l$.

Coefficient $K_d$ refers to drag, namely when the kite pulls the ground constraint with forces and speeds along the wind, while coefficient $K_l$ refers to lift, namely when the kite pulls the ground constraint by oscillating in order to sweep the wind front surface. Due to the lift, the kite speed is much higher than the wind speed. The kite power is as higher as higher the lift is with respect to the drag.

As an example, we can suppose that $V_k/V_w=10$, $K_l=1.2$ and $K_d=0.1$. In such case, KPF=20 would be obtained.

Supposing the air density ρ constant and equal to 1.225 kg/m³, the specific power generated by wind (Specific Wind Power) would be:

$$SpecificWindPower = \frac{1}{2}\rho V_w^3 = 0.5*1.225*6^3 = 132.3\ W/m^2$$

The power that can be generated (KitePower) by means of the kite is expressed by the following formula:

KitePower=KPF*SpecificWindPower*A

If, for example, a kite were used with a surface of 18 m² pushed at the speed of 60 m/s by a wind blowing at 6 m/s, the power that it is possible to generate at rope level would be 47628 W. Such power therefore would correspond to the maximum power that the kite 2 is able to generate.

The value assumed by KPF anyway depends on the kite 2 efficiency. It is possible to make KPF assume values greater than 20. If, for example, KPF assumed a value equal to 40, the maximum power that can be obtained from a kite 2 with an area of 18 m² would be 95256 W.

The invention claimed is:

1. A wind system for converting energy, the wind system comprising:
    at least one kite adapted to be driven from ground immersed in at least one wind current; and
    at least one module adapted to translate on at least one rail placed next to ground, the module being connected through at least one rope to the kite, the kite being adapted to be driven by the module in order to drag the module on the rail and perform the conversion of wind energy into electric energy through at least one generating system cooperating with the module and the rail, the rope being adapted both to transmit mechanical energy from and to the kite and to control a flight trajectory of the kite,
    wherein the generating system comprises at least one generator or motor which is adapted to convert wind energy into electrical energy through a movement of the module relative to the rail.

2. The wind system of claim 1, wherein the kite is made of semi-rigid material, the kite being equipped with an enlightened frame and being shaped as rigid wings of a glider, the kite being further equipped with lozenges in polymers and the semi-rigidity of the kite being asymmetric with respect to two sizes of the kite to keep a side flexibility.

3. The wind system of claim 1, wherein at least two of the kites are connected in series in a multi-layer configuration to form a train connected through at least one of the ropes to one of the modules.

4. The wind system of claim 3, wherein the ropes connecting the kites in the train are integrated in walls of the kites, and the walls of the kites of the train are a connecting element between the kites, the walls preferably having an airfoil section.

5. The wind system of claim 1, wherein a section of the rope is variable, the rope having in particular a smaller section next to the kite and a greater section next to the module, and a variation of the section of the rope being continuous or in steps with offsets.

6. The wind system of claim 1, wherein a section of a length of the rope nearest to the kite is aerodynamically modeled to provide an asymmetric lift, the rope being preferably coated with an extruded sheath with a star-section.

7. The wind system of claim 1, further comprising a smart control system adapted to automatically control the kite along the flight trajectory, the wind system preferably comprising a supply system cooperating with the smart control system for managing accumulation and delivery of the electric energy.

8. The wind system of claim 7, wherein the smart control system is equipped with a set of sensors placed on the kite, the sensors placed on the kite preferably having an autonomous supply, the sensors placed on the kite preferably sending information in wireless mode to ground components of the smart control system, the smart control system being preferably equipped with a set of ground sensors.

9. The wind system of claim 1, wherein the kites are equipped with an actuating and stabilizing system of a sideslip maneuver.

10. The wind system of claim 9, wherein the actuating and stabilizing system comprises at least one spoiler, the spoiler being preferably actuated through systems with autonomous supply, or being preferably actuated through systems supplied by at least one cable that from the module reaches the kite, the systems that actuate the spoiler being preferably piezoelectric and containing shape-memory polymers, or containing fibers made of metallic shape-memory alloys, the systems that actuate the spoiler preferably receiving commands in wireless mode from the smart control system.

11. The wind system of claim 9, wherein the actuating and stabilizing system of the sideslip maneuver comprises at least one directional sponson, the directional sponsons being preferably transverse to a thrust direction of the wind current on the kite and are flexed disappearing in order not to modify an efficiency of the kite, during the sideslip maneuver the directional sponsons being preferably lifted, actuated by a flow.

12. The wind system of claim 1, wherein the module is equipped with at least one trolley to translate along the rail.

13. The wind system according to claim 12, wherein the trolley has an aerodynamic shape, on the trolley components being preferably arranged for driving the kite and storing the ropes or components being preferably arranged for converting energy.

14. The wind system of claim 1, wherein the rails are at different heights, at least one of the rails being preferably placed at a lower height with respect to at least one most external of the rails and at a higher height with respect to at least one most internal of the rails, each of the modules being preferably equipped with two of the trolleys that translate on the rails placed at different heights, the components for driving the kite and for storing the ropes being preferably arranged on the trolley that translates on the rail placed at a lower height, the components for converting energy being preferably arranged on the trolley that translates on the rail placed at a higher height.

15. The wind system of claim 1, further comprising at least one recovering system of the kite.

16. The wind system of claim 15, wherein the recovering system is slanted with respect to ground, the recovering system being preferably constrained to the trolley next to at least one end, or the recovering system being preferably constrained to the trolley that translates at a higher height next to an end of the recovering system from which the ropes go out towards the kite, or the recovering system being preferably constrained to the trolley that translates at a lower height next to an end of the recovering system in which the ropes go in towards the kite, the recovering system being preferably equipped with cushioned wheels that translate on at least one rail.

17. The wind system of claim 1, further comprising a stretched flexible structure, the stretched flexible structure contributing to support a weight of the recovering system and mutually connecting at least two of the modules, the stretched flexible structure being preferably equipped with a vertical lattice-type structure, or the stretched flexible structure being preferably equipped with tie-rods constrained at an end to the recovering system and at another end to the vertical lattice-type structure, or the stretched flexible structure being preferably equipped with tie-rods that mutually connect the modules, or the stretched flexible structure being preferably equipped with tie-rods that mutually connect the recovering systems, the stretched flexible structure having preferably triangular sections developed by following a cylinder symmetry, the stretched flexible structure preferably comprising a ring that follows interfaced behaviors with respect to the modules.

18. The wind system of claim 1, wherein the rail describes a closed path, the closed path being preferably circular or elliptical, the elliptical path having preferably a major axis perpendicular to a direction in which the wind current blows.

19. The wind system of claim 1, wherein the rails are horizontal, parallel or concentric, the rails being preferably slanted to counteract a radial centrifugal force due to the translation of the module and to a pull of the kite, the rails being preferably lifted from the ground by pillars.

20. The wind system of claim 1, wherein the rail is equipped with wheels on which the trolley of the module translates, the wheels preferably housing alternators keyed-in on the wheels for generating electricity.

21. The wind system of claim 1, wherein the rail is equipped with at least one rack, the rack being preferably arranged on the rail with a toothed surface perpendicular to a plane of the rail and oriented towards a center of the closed path described by the rail.

22. The wind system of claim 1, wherein the rail is equipped with electromagnets to allow a magnetic levitation and/or an energy conversion through linear motors that are reversibly used, the trolley preferably translating on the rail by permanent magnets and/or electromagnets, exploiting a magnetic levitation principle, the trolley being preferably equipped with the wheels to support the trolley weight, the wheels being preferably interfaced with the module through springs coupled in parallel with dampeners.

23. The wind system of claim 20, wherein the wheels are preferably joined in a further trolley, the further trolley is constrained to the trolley, the wheels of the further trolley being preferably arranged mutually perpendicular, at least one of the wheels of the further trolley preferably rolling on a plane parallel to a plane of the rail to support the module weight, or at least one of the wheels of the further trolley preferably rolling on a plane parallel to a plane of the rail in order to prevent the module from overturning, or at least one of the wheels of the further trolley preferably rolling on a plane perpendicular to a plane of the rail to counteract a radial force operating on the module.

24. The wind system of claim 20, wherein a section of the rail is shaped as two faced "Cs" next to a concave part thereof, the further trolley translating on the rail inside a concavity of one of the two faced "Cs".

25. The wind system of claim 20, wherein a section of the rail is rectangular, the trolley translating on one of the rails with the wheels that roll on three sides of the rectangular section to embrace a side of the rail oriented inside or outside the closed path.

26. The wind system of claim 15, wherein the recovering system is made of a trellis-type structure, the trellis-type structure being preferably equipped with at least one padding net for containing the kite, a section of the trellis-type structure being preferably triangular, the padding net being preferably equipped with an entanglement adapted to avoid jamming in a sliding of the kite.

27. The wind system of claim 15, wherein the recovering system is equipped with at least one articulated joint in order to be partly or completely able to be oriented, an end part able to be oriented of the recovering system being preferably driven through a system composed of at least three ropes.

28. The wind system of claim 27, wherein each one of the ropes is constrained to at least one hydraulic cylinder, the hydraulic cylinder being preferably hinged to the recovering system next to the articulated joint, the hydraulic cylinder being preferably actuated by a hydraulic system controlled by the smart control system.

29. The wind system of claim 27, wherein the end part able to be oriented is driven through linear electro-mechanical modules, the linear electro-mechanical modules being preferably controlled by the smart control system, the end part able to be oriented being preferably driven through the stretched flexible structure, the end part having preferably an increasing section proceeding towards an outlet edge.

30. The wind system of claim 15, wherein the recovering system is placed on the ground and the recovering system comprises at least one container with hinged cover, the container having preferably a shape suitable for housing at least one of the trains of the kites, the recovering system being preferably arranged radially, or inside the closed path, or outside the closed path, the recovering system being preferably upwards slanted during recovery and takeoff operations of the kite, the recovering system being preferably arranged horizontally next to the ground when there are no recovery and takeoff operations of the kite.

31. The wind system of claim 30, wherein the recovering system is handled by at least one linear actuator, the linear actuators being preferably arranged on the two sides of the recovering system.

32. The wind system of claim 31, wherein the recovering system is constrained to the ground by rods, the rods next to their ends being preferably hinged to the ground and to the recovering system, the linear actuators being preferably hinged both to the ground and to the rods, the rods and the linear actuators being preferably mutually constrained so that, by actuating the linear actuators, an end of the recovering system nearest to the rail is lifted at the same height at which the rail is and an end of the recovering system farthest from the rail is lifted at a higher height than the one at which the rail is.

33. The wind system of claim 30, wherein the container with hinged cover is adapted to be opened as a platform, or each one of the containers with hinged cover is longitudinally sectioned to be composed of at least two parts, at least one of the parts being preferably a box of the container, the box being preferably arranged with its concavity oriented upwards, and at least one of the parts preferably composing a cover of the container.

34. The wind system of claim 24, wherein the container with hinged cover is adapted to be opened as a platform through at least one linear actuator, the linear actuators being preferably controlled by the smart control system, the linear actuators being preferably hydraulic cylinders actuated by a hydraulic system, the linear actuators being preferably linear electro-mechanical modules.

35. The wind system of claim 1, wherein the ropes are equipped with an automatic connection and disconnection system through which the ropes can be reversibly connected and disconnected to and from the kite.

36. The wind system according to claim 30, wherein the recovering system comprises at least one automatic storage system adapted to recover and takeoff in succession the trains of the kites and orderly arrange the trains of the wing kites inside the container with hinged cover, the automatic storage system being preferably controlled by the smart control system, the automatic storage system being preferably equipped with translating shelves handled by belts, the shelves preferably translating by keeping themselves parallel and describing a closed path.

37. The wind system of claim 33, wherein the recovering system comprises at least one disappearing guiding system to facilitate landing of the kites onto the container with hinged cover opened as a platform, the disappearing guiding system being preferably placed next to the container with hinged cover, the disappearing guiding system is composed of at least one pair of rods placed on the sides of the container with hinged cover, the disappearing guiding system being preferably controlled by the smart control system.

38. The wind system of claim 1, further comprising for each of the modules a recovery and expulsion system for the kite, the recovery and expulsion system being preferably placed inside the recovering system, the recovery and expulsion system preferably comprising at least one trolley sliding along at least two rails inside the recovering system, the recovery and expulsion system being preferably equipped with at least one artificial wind thrust device, a plurality of the artificial wind thrust devices being preferably arranged along the length of the recovering system, the artificial wind thrust devices being preferably controlled by the smart control system.

39. The wind system of claim 1, further comprising for each of the modules a system for absorbing the force peaks of the ropes, the system for absorbing the force peaks being preferably equipped with at least one dampened counterweight lifted from the ground and vertically translating, the counterweight being preferably lifted from the ground due to the effect of a tension of the rope.

40. The wind system of claim 1, further comprising for each of the modules a system for frictioning the ropes, the frictioning system being preferably equipped with at least one pulley constrained to a linear guide and at least one spring constrained next to an end to the pulley and next to another end to the trolley, the spring being preferably compressed due to the tension of the rope.

41. The wind system of claim 1, further comprising for each of the modules a winding and unwinding system of the rope, the winding and unwinding system preferably comprising at least four first winches for each of the ropes arranged on two levels and having parallel rotation axes, the first winches being connected to at least one first electric motor controlled by the smart control system, the first electric motor being preferably also an electric generator.

42. The wind system of claim 41, wherein the first winches are connected to the first electric motor through gears and by interposing at least one epicycloid-type reducer, each of the first winches being preferably connected to one of the first electric motors by interposing at least one epicycloid-type reducer, around each of the first winches the rope being preferably wound for three quarters of circumference, a surface of the first winches being preferably shaped to house the rope and increase a contact surface, the first winches preferably having different surface roughness, the winding and unwinding system preferably comprising a winch for each of the ropes, around the winch the rope being wound and performing a limited number of revolutions, such that there is a single layer of windings, the winding and unwinding system preferably comprising for each of the ropes at least two pairs of faced tracks pushed by pistons, inside each one of which the rope is inserted.

43. The wind system according to claim 1, further comprising for each of the modules a storing system for the rope, the storing system preferably comprising at least one second winch for each of the ropes, on each one of the second winches the rope is wound or unwound, the second winch being connected to a second electric motor controlled by the smart control system, the second winch being preferably connected to the second electric motor by interposing at least one epicycloid-type reducer, the second winch being preferably equipped with at least one driving module adapted to compel the rope to perform an orderly winding on the second winch, the second winch being preferably assembled on a trolley sliding along a rail in parallel with a rotation axis of the winch, a sliding of the trolley along the rail being preferably controlled by a sliding mechanism together with a rotation of the second winch, the sliding mechanism being preferably actuated by a third electric motor controlled by the smart control system, the sliding mechanism being preferably connected to the third electric motor by interposing at least one epicycloid-type reducer.

44. The wind system of claim 1, further comprising for each of the modules at least one transmission system adapted to guide the ropes towards the kite, the transmission system preferably comprising at least one pulley assembled on the trolley of the recovery and expulsion system of the kite, at least one fixed pulley directly constrained to the module, at least one pulley for each of the systems for absorbing the force peaks of the ropes, at least one pulley for each of the systems for frictioning the ropes, and at least one pulley assembled on sliders of the driving modules of the ropes; the slider preferably sliding along a rail in parallel with a rotation axis of the winch of the storing system, a sliding of the slider along the rail being preferably controlled by a sliding mechanism together with a rotation of the winch, the sliding mechanism being preferably actuated by a fourth electric motor controlled by the smart control system.

45. The wind system of claim 7, wherein the system for generating electricity also operates as motor, the generating system being actuated by a translation of the module on the rail when it operates as generator and being controlled by the smart control system when it operates as motor.

46. The wind system of claim 12, wherein the at least one generator or motor is directly actuated by a rotation of at least one of the wheels of the trolley of the module, the system preferably comprising for each of the modules at least one toothed wheel that meshes with and rolls on the rack of the rail, the at least one generator or motor being preferably directly actuated by a rotation of at least one of the toothed wheels of the rack, for each of the modules the generating system preferably comprising at least one reversible magnetic linear motor adapted to operate also as generator.

47. The wind system of claim 1, wherein each of the modules is equipped with permanent magnets, the permanent magnets inducing currents in the electromagnets with which the rail is equipped so that the currents partly generate a magnetic field that is opposed to the inducing one making the module levitate, the permanent magnets being preferably helped by superconductor solenoids.

48. The wind system of claim 47, wherein a modular composition of the permanent magnets and of respective electromagnets faced on the rail and on the module brings about a continuous variation of induced flows during a relative translation of the module with respect to the rail, the flow variations in the electromagnets being preferably coupled with electric energy collecting windings, the electric energy collecting windings being preferably controlled by a power electronics, the permanent magnets being preferably neodymium iron boron magnets, a connection of the permanent magnets to the trolley preferably having two degrees of freedom like a ball-type articulation, a connection of the permanent magnets to the trolley being preferably in a barycenter area of the permanent magnets.

49. A method for producing electric energy through a wind system, the method comprising the steps of:
governing a flight trajectory of a kite so that the kite proceeds transversely with respect to a direction of a wind current, the kite tensioning ropes connected to a module of the wind system, translating the module on the rails due to a dragging effect and going away from the module by unwinding the ropes through first winches by first electric motors;
governing the flight trajectory of the kite so that the kite proceeds along the same direction as the wind current, the kite tensioning the ropes connected to the module of the wind system, translating the module on the rails due to a dragging effect and approaching the kite to the module by rewinding the ropes through the first winches by the first electric motors;
governing the flight trajectory of the kite so that the kite proceeds transversely with respect to the direction of the wind current, the kite tensioning the ropes connected to the module of the wind system, traveling the module on the rails due to a dragging effect and moving away the kite from the module by unwinding the ropes through the first winches by the first electric motors;
governing the flight trajectory of the kite so that the kite proceeds in an opposite direction with respect to the direction of the wind current without generating any braking effect for the translation of the module of the wind system by rewinding the ropes through the first winches by the first electric motors; and
repeating the previous steps,
wherein at least one of the governing steps is performed automatically by the smart control system.

50. The method of claim 49, wherein the first motors function as generators so as to produce electricity through a rotation of the first winches.

* * * * *